US012237988B1

(12) United States Patent
Hall et al.

(10) Patent No.: US 12,237,988 B1
(45) Date of Patent: Feb. 25, 2025

(54) SERVICE ANALYZER INTERFACE PRESENTING PERFORMANCE INFORMATION OF MACHINES PROVIDING COMPONENT SERVICES

(71) Applicant: Splunk Inc., San Francisco, CA (US)

(72) Inventors: Adrian Hall, Lake Forest Park, WA (US); Kenneth M. Sternberg, Seattle, WA (US); Anupadmaja Raghavan, San Jose, CA (US); Brian C. Reyes, Seattle, WA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/879,694

(22) Filed: Aug. 2, 2022

Related U.S. Application Data

(63) Continuation of application No. 16/554,467, filed on Aug. 28, 2019, now Pat. No. 11,405,301, which is a
(Continued)

(51) Int. Cl.
*H04L 43/16* (2022.01)
*G06F 16/2457* (2019.01)
(Continued)

(52) U.S. Cl.
CPC ........ *H04L 43/16* (2013.01); *G06F 16/24578* (2019.01); *G06F 16/282* (2019.01);
(Continued)

(58) Field of Classification Search
None
See application file for complete search history.

(56) References Cited

U.S. PATENT DOCUMENTS 8,412,696 B2   4/2013   Zhang et al.
8,589,403 B2   11/2013  Marquardt et al.
(Continued)

FOREIGN PATENT DOCUMENTS

CN      103399810 A   *  11/2013
WO   WO-2013119200 A1  *  8/2013   .......... G06F 11/3428

OTHER PUBLICATIONS

Carasso, David, "Exploring Splunk Search Processing Language (SPL) Primer and Cookbook" CITO Research, 2012, 156 pages.
(Continued)

*Primary Examiner* — Jonathan A Bui
(74) *Attorney, Agent, or Firm* — Shook, Hardy & Bacon L.L.P.

(57) ABSTRACT

Provided are systems and methods for determining and displaying service performance information via a graphical user interface. A method can include visually rendering a service-level dashboard reflecting performance of a service and presenting a visual indication of health of each component service and a list of events each corresponding to a change in performance of one of the component services. The method can further include responsive to receiving, via a graphical user interface (GUI), a selection of a component service, visually rendering a system-level dashboard reflecting performance of the selected component-level service, wherein the component service is performed by one or more machines, and wherein the system-level dashboard presents the machines and one or more events each corresponding to a change in performance of one of the machines.

20 Claims, 23 Drawing Sheets

Related U.S. Application Data continuation of application No. 15/925,570, filed on Mar. 19, 2018, now Pat. No. 10,439,922, which is a continuation of application No. 14/523,661, filed on Oct. 24, 2014, now Pat. No. 9,935,864.

(60) Provisional application No. 62/058,043, filed on Sep. 30, 2014.

(51) Int. Cl.
    *G06F 16/28*     (2019.01)
    *G06F 16/904*     (2019.01)
    *H04L 41/0631*     (2022.01)
    *H04L 41/0677*     (2022.01)
    *H04L 41/22*     (2022.01)
    *H04L 43/0817*     (2022.01)
    *H04L 67/02*     (2022.01)

(52) U.S. Cl.
CPC .......... *G06F 16/904* (2019.01); *H04L 41/065* (2013.01); *H04L 41/0677* (2013.01); *H04L 41/22* (2013.01); *H04L 43/0817* (2013.01); *H04L 67/02* (2013.01)

(56) References Cited

U.S. PATENT DOCUMENTS

| | | | |
|---|---|---|---|
| 8,682,925 | B1 | 3/2014 | Marquardt et al. |
| 8,826,434 | B2 | 9/2014 | Merza |
| 9,124,612 | B2 | 9/2015 | Vasan et al. |
| 9,130,860 | B1 | 9/2015 | Boe et al. |
| 9,130,971 | B2 | 9/2015 | Vasan et al. |
| 9,215,240 | B2 | 12/2015 | Merza et al. |
| 10,229,243 | B2 * | 3/2019 | Poston ................ H04L 41/0604 |
| 10,574,548 | B2 | 2/2020 | Coates et al. |
| 2002/0198985 | A1 * | 12/2002 | Fraenkel ............. H04L 41/5009 709/224 |
| 2005/0021733 | A1 * | 1/2005 | Clinton ................ G06F 11/008 709/224 |
| 2007/0079243 | A1 * | 4/2007 | Leigh .................... G06F 11/323 709/224 |
| 2012/0182927 | A1 * | 7/2012 | Wiesner ................ H04W 88/04 370/315 |
| 2012/0197848 | A1 * | 8/2012 | Bhagwan ............... G16H 10/60 707/E17.007 |
| 2013/0018686 | A1 * | 1/2013 | Wright ............ G06Q 10/06398 705/7.14 |
| 2013/0238403 | A1 * | 9/2013 | Benson .................. G06Q 10/06 705/7.42 |
| 2014/0122711 | A1 * | 5/2014 | Lientz ................... H04L 41/083 709/224 |
| 2014/0160238 | A1 | 6/2014 | Yim et al. |
| 2014/0324862 | A1 | 10/2014 | Bingham et al. |
| 2015/0050637 | A1 * | 2/2015 | James-Hatter .......... G09B 7/02 434/362 |
| 2015/0085681 | A1 * | 3/2015 | Bowdery ............... H04W 24/02 370/252 |
| 2015/0106166 | A1 * | 4/2015 | Gutierrez, Jr. ... G06Q 10/06393 705/7.39 |
| 2015/0200824 | A1 * | 7/2015 | Sadovsky ........... H04L 41/5009 709/224 |
| 2015/0254955 | A1 * | 9/2015 | Fields ................ G06Q 30/0283 340/576 |
| 2015/0314681 | A1 * | 11/2015 | Riley, Sr. ............. B60K 28/066 340/576 |
| 2016/0093226 | A1 * | 3/2016 | Machluf .................. G09B 5/00 434/236 |
| 2016/0094411 | A1 * | 3/2016 | Brennan ............. H04L 41/5009 709/224 |
| 2016/0267420 | A1 * | 9/2016 | Budic ................ G06Q 10/0631 |

OTHER PUBLICATIONS

Bitincka et al., "Optimizing Data Analysis With a Semi-Structured Time Series Database" SLAML, 2010, 9 pages.
VSphere Monitoring and Performance, Update 1, vSphere 5.5, EN-001357-00, 2010-2014, http://pubs.vmware.com/vsphere-55/topic/com.vmware.ICbase/PDF/vsphere-esxi-vcenterserver-551-monitoring-performance-guide.pdf, 174 pages.

* cited by examiner

```
Original Search: 1501
search "error" | stats count BY host

Sent to peers: 1502
search "error" | prestats count BY host(map)

Executed by search head: 1503
Merge prestats results received from peers (reduce)
```

SERVICE ANALYZER INTERFACE PRESENTING PERFORMANCE INFORMATION OF MACHINES PROVIDING COMPONENT SERVICES

RELATED APPLICATIONS

This patent application is a continuation of U.S. patent application Ser. No. 16/554,467, filed Aug. 28, 2019, which is a continuation of U.S. patent application Ser. No. 15/925,570, filed Mar. 19, 2018, now U.S. Pat. No. 10,439,922, which is a continuation of U.S. patent application Ser. No. 14/523,661, filed Oct. 24, 2014, now U.S. Pat. No. 9,935,864, which claims the benefit of U.S. Provisional Patent Application No. 62/058,043, filed Sep. 30, 2014, each of which is incorporated herein by reference.

TECHNICAL FIELD

The embodiments described herein relate generally to data processing and data management systems. More particularly, embodiments relate to determining and displaying service performance information via a graphical user interface.

BACKGROUND

Information systems generate vast amounts and wide varieties of machine data such as activity logs, error logs, configuration files, network messages, database records, etc. This machine data can be useful in troubleshooting systems, detecting operation trends, identifying security problems, and measuring system performance. For example, a system administrator can use error logs to determine that a particular component is xperiencing a relatively high number of errors and, thus, may have a problem that needs to be addressed.

In the context of IT (information technology) systems, it is desirable for IT specialist to quickly identify any infrastructure components affected by a problem and determine the root cause of the problem. For example, if a particular machine, such as a server, is experiencing problems, the IT specialist will want to know that the problem exists, and the IT specialist will want to identify the particular machine(s) that is causing the problem so that they can focus their efforts on fixing the machine(s). These types of issues can be particularly difficult to diagnose and remedy in complex systems, such as e-mail systems, database systems, or server systems that involve a large number of interrelated processes running on different machines. For example, the Microsoft Exchange™ service (a calendaring software, a mail and contact manager developed by Microsoft Corporation of Redmond, Washington) may employ a number of different component services, or systems, such as Outlook™ RPC, Outlook™ Web Access, ActiveSync™ and so forth, that execute on a variety of different servers. If one of these servers has a problem it can be compounded by the fact that the problem may not manifest itself in an easily detectable manner, and, even if the problem is detected, it can be difficult to identify the source of the problem. Although some systems, such as the Microsoft Exchange™ service, provide access to performance parameters, such as "counters," that can provide insight into the health of a system, typically these parameters alone do not provide IT managers with the information they need to effectively diagnose and correct problems within their systems.

BRIEF DESCRIPTION OF THE DRAWINGS

FIG. 15 illustrates an example search query received from a client and executed by search peers in accordance with the disclosed embodiments.

FIG. 16B illustrates an example data summary dialog that enables a user to select various data sources in accordance with the disclosed embodiments.

FIG. 17B illustrates an example incident review dashboard in accordance with the disclosed embodiments.

DETAILED DESCRIPTION

Figure 1A:
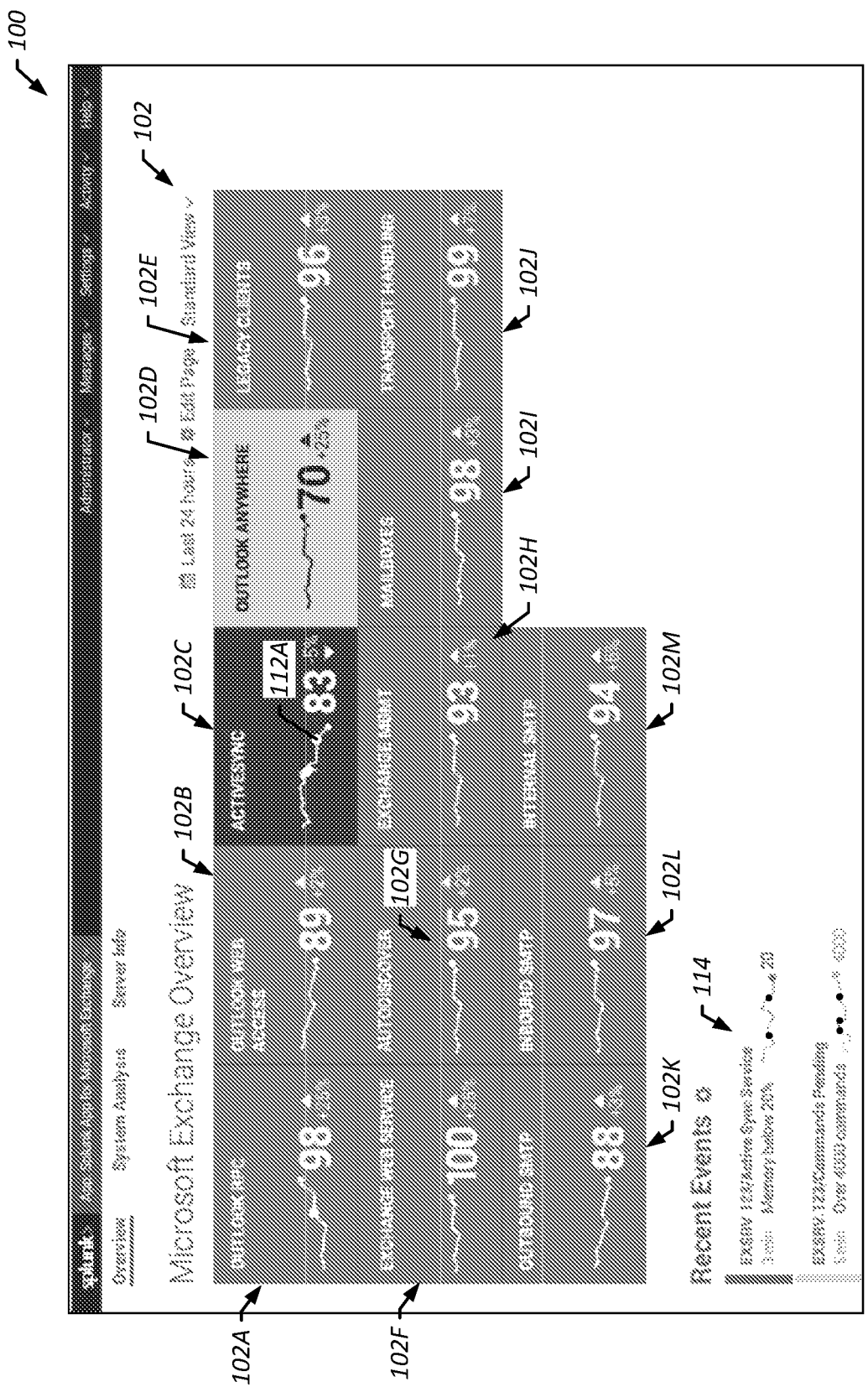
FIG. 1A illustrates an example service-level dashboard in accordance with the disclosed embodiments.

Throughout this description for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the described embodiments.

Provided are embodiments relating to graphical display of performance information for a service and its various components, or elements. Embodiments may include graphical displays of one or more dashboards that enable a user to view performance information for various aspects of a service or application (e.g., the Microsoft Exchange™ service) at varying levels of detail. For example, a high-level dashboard (or service-level dashboard) may provide a graphical overview of the performance of a service including an overview of the performance of individual services associated with the service. In such an arrangement, the overall service may be referred to as a "super-service" or a "parent service", and the individual services that make-up, or are otherwise associated with the overall service, may be referred to as "component services," "sub-services" or "child services". In any event, the overall service may be a service, and the individual services (or component services) may be services as well. In some instances, a service level dashboard can include information relating to a score (e.g., a "composite component service score") for each of the individual component services. A mid-level dashboard (system-level dashboard) may provide a graphical overview of the performance of a particular one of the component services, for example, including an overview of the performance of machines (e.g., including physical and/or virtual machines) associated with the component service. In some embodiments, a machine may be employed by, or otherwise associated with, more than one service. For example, a given machine may be employed by a first service as well as a second service (e.g., a given machine may be employed by a first service component as well as a second service component of the same super-service). As a further example, a given machine may be employed by a component service of a first super-service as well as a component service of a second super-service. In some instances, a system-level dashboard can include information relating to the composite component service score for the component service, as well as information relating to a score (e.g., a "composite machine score") for each of the individual machines associated with the component service. A low-level dashboard (or machine-level dashboard) may provide a graphical overview of the performance of a particular one of the machines of a component service, for example, including an overview of metrics for elements (e.g., processes, memory, etc.) associated with the machine. In some instances, a machine-level dashboard can include information relating to a score (e.g., a "metric score") for each of the individual metrics associated with the machine.

The performance information conveyed by these dashboards may be useful for assessing the health, or performance, of a service and/or diagnose problems with the service. For example, a service administrator can use a service-level dashboard to assess the health of a service and diagnose problems with a service, the service administrator can drill-down to a system-level dashboard to assess the health of a component service (e.g., a subcomponent of the service) and diagnose problems with the component service. The service administrator can also drill-down to a machine-level dashboard to assess the health of a machine of the component service and diagnose problems with the machine.

In some instances, the performance information is based on data, or source data, received from one or more external data sources, such as servers, computers, routers, databases, operating systems, applications and/or the like. The source data may include raw data, which can include unstructured data, machine data, performance measurements or other time-series data, such as data obtained from weblogs, syslogs, or sensor readings. In some embodiments, the performance information can include or be based on data provided by an operating system, such as by an operating system's performance software executing on the machines associated with the service, and/or provided by a hypervisor (or virtual machine monitor (VMM)) associated with a virtual machine. In the context of the Microsoft Exchange™ service, a Windows Performance Monitor™ application may provide over 200 parameters, or "counters," that are indicative of a machine's performance. These may include, for example, (a) processor and process counters (e.g., "Processor (_Total)\% Processor Time"—showing the percentage of time that the processor is executing application or operating system processes), (b) memory counters (e.g., "Memory\Available Mbytes"—showing the amount of physical memory, in megabytes (MB), immediately available for allocation to a process or for system use), (c) memory paging counters, (d) memory consumption counters, (e) process working set counters, (f) process handle counters, (g) Microsoft .NET Framework counters, (h) network counters, (i) Exchange domain controllers connectivity counters, and/or the like. In some embodiments, the performance information can include or be based on data that is retrieved from a data store or similar source. For example, in the context of a system that can store and access performance data, such as SPLUNK® ENTERPRISE system (described in more detail herein with regard to at least FIGS. 11-17D), the source data may include performance data retrieved from a data store via one or more searches of the data store. Such searches are described in more detail herein with regard to at least FIGS. 13 and 16A.

In some embodiments, the source data may be used to calculate (or otherwise determine) metric values for one or more elements of a service. These metric values can be used, in turn, to calculate (or otherwise determine) other performance information, such as composite metric scores, composite machine scores, and composite component service scores. For example, a metric value for each monitored element of a machine can be determined from source data, the metric values can be used to calculate a corresponding metric score for each of the monitored elements, the metric scores can be used to calculate a composite score for the machine (e.g., a composite machine score), and the composite machine score for a machine in a component service can be combined with composite machine scores for other machines in the component service to calculate a composite score for the component service (e.g., a composite component service score). The use and calculation (or determination) of performance data, including metric values, metric scores, composite machine scores, and composite component service scores are discussed in more detail herein with regard to at least FIGS. 7 and 8.

Figure 1B:
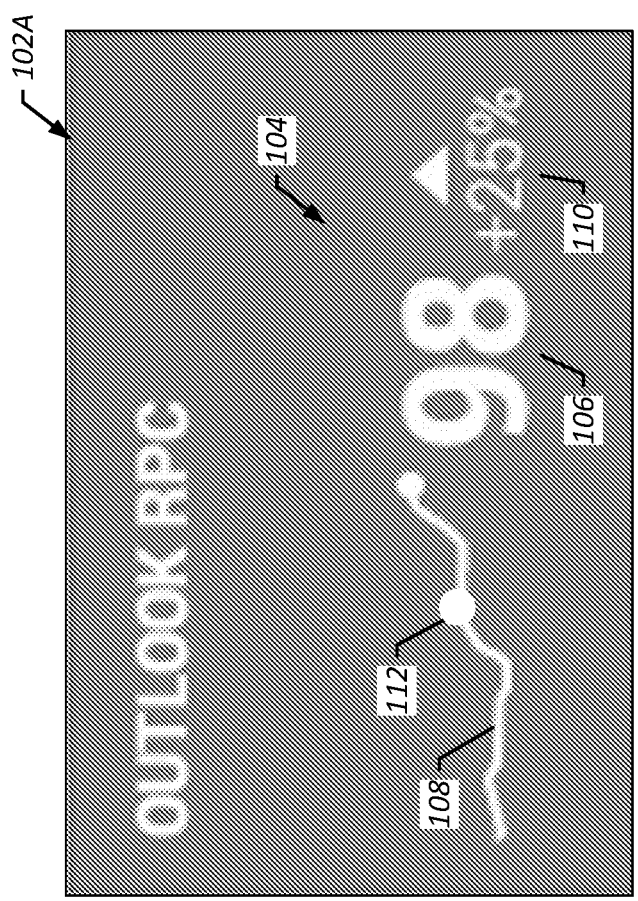
FIG. 1B illustrates an example tile of the service-level dashboard shown in FIG. 1A in accordance with the disclosed embodiments.

Turning now to the figures, FIG. 1A illustrates an example service-level dashboard, 100 in accordance with the disclosed embodiments. The service-level dashboard 100 may display performance information indicative of the health of multiple component services of an overall service. In the illustrated embodiment, the service-level dashboard 100 can display performance information indicative of the health of multiple component services of the Microsoft Exchange™ service. For example, the service-level dashboard 100 may include a number individual component service tiles ("tiles") 102 (e.g., tiles 102A-102M) (e.g., interactive elements) that each represent a respective component service, or system, of the Microsoft Exchange™ service. For example, a first tile 102A can represent the Outlook RPC component service, a second tile 102B can represent the Outlook Web Access component service, a third tile 102C can represent the ActiveSync component service, and so forth. In some embodiments, a user can reorder the tiles 102 (e.g., via simple drag-and-drop of the tiles 102 within the displayed set of tiles 102). Each of these tiles 102A-102M may include performance information relating to the health of the particular component service. Referring to the first tile 102A (reproduced in FIG. 1B), the performance information 104 may include a composite component service score 106, a plot (or spark-line) 108, and a change value 110. The composite component service score 106 may represent a health of the respective component service. The plot (or spark-line) 108 may illustrate the recent history of the composite component service score 106, and the change value 110 may represent the change of the composite component service score 106 over a given period (e.g., the percent change between the last determined composite service score). For example, the performance information 104 of the first tile 102A for the Outlook RPC component service may include a composite component service score 106 of "98" representing a relatively healthy Outlook RPC component service (e.g., operating at an acceptable level), a plot (or spark-line) 108 having generally upward slope indicating a generally positive trend in the recent history of the composite component service score 106, and a 25% change value 110 representing the percentage change from the last composite service score to the current composite service score of "98". The score may be a percentage (e.g., 98%), an absolute score (e.g., a value of 98), and/or the like. Moreover, a score can be based on any suitable ranges (e.g., 0-100, 0-200, and/or the like). In some instances, a high score may be indicative of a better or healthier state, and a low score may be indicative of a worse or unhealthy state, or vice versa. For example, given a score rage of 0-100 with a high score being indicative of a healthy state, a score in the range of 50-100 may be considered good, acceptable, or healthy (e.g., the associated service or machine does not need attention), a score the in the range of 25-50 may be considered moderate or of moderate health (e.g., the associated service or machine needs attention), and a score in the range of 0-25 may be considered poor, critical, unhealthy or of critical health (e.g., the associated service or machine needs immediate attention). In some embodiments, the plot (or spark-line) 108 may include transition markers, such as 112A, and/or may be color-coded as discussed in more detail below with regard to at least FIG. 4.

In some embodiments, a component service tile, similar to 102, can be color-coded to provide a visual indication of the component service's health. For example, a tile, such as 102A, may be green in color if the corresponding component service is operating normally or is "OK" (e.g., all of the metrics for the various machines of the component service are within acceptable ranges), the tile, such as 102D, may be yellow in color if the corresponding component service appears to have at least some issues for concern, or has "moderate" problems (e.g., a central processing unit (CPU) usage for a machine is higher than normal), and the tile, such as 102C, may be red in color if the corresponding component service appears to have at least some issues of particular concern, or has "critical" problems (e.g., a machine is offline). In the illustrated embodiment, for example, the background of the tile, such as 102C, for ActiveSync component service may be red in color (e.g., indicative of the ActiveSync component service having "critical" problems), the background of the tile, such as 102D, for Outlook Anywhere component service may be yellow in color (e.g., indicative of the Outlook Anywhere component service having "moderate" problems), and the background of the other tiles, such as 102A, 102B, 102E-102M (e.g., the tile 102A for the Outlook RPC component service, the tile 102B for the Outlook Web Access component service, and so forth) may be green in color (e.g., indicative of the Outlook RPC component service, the Outlook Web Access component service and so forth operating in an "OK" state-having no identified problems).

In some instances, the color of a tile, such as 102C, for a component service can correspond to the lowest health status of any of the individual machines associated with the component service, e.g., regardless of the overall composite component service score 106 for the component service. In the illustrated embodiment, for example, despite the ActiveSync component service having a relatively high component service score of "83," the tile 102C may be red in color due to the fact that one or more of the servers in the system is performing poorly. For example, as discussed in more detail below with regard to FIGS. 2 and 3, one of the machines (e.g., server EXSRV.123) of the ActiveSync service has a composite machine score of "32" which falls in the range of a "critical" problem. Thus, the color (status) of the component service can be a composite calculation of the colors (statuses) of the machines (or hosts) of the component service (e.g., if any machine (or host) is red, then the component service's color is red, if all machines (or hosts) are green, then the component service's color is green, otherwise the component service's color is yellow). Similarly the color of a machine (or host) can be a composite calculation of the colors (statuses) of the performance metrics for the machine (or hosts) (e.g., if all performance metrics are green, then the machine's (or host's) color is green, if any performance metric is red, then the machine's (or host's) color is red, otherwise the machine's (or host's) color is yellow). This can provide a "bubble-up" effect where the composite color for a component service is the worst color (e.g., red <yellow <green) (or status, e.g., critical <moderate <ok) of the composite metrics across all machines (or hosts) involved in that component service. Such a tile color-coding scheme may help to highlight specific problems that may otherwise be masked by a component service that has good or otherwise acceptable composite component service score 106 and, thus, appears to be operating normally.

The service-level dashboard can include a list of recent events 114. The list of recent events 114 may include a listing of threshold events corresponding to a transition of a metric (for one of the machines of a component service or a component service) from one state to another. In some embodiments, the a list of recent events 114 may provide an interactive link to additional performance information, For example, interacting with (e.g., clicking or and/or hovering over) an event in the list of recent events 114 may result in a pop-up dialog with information regarding the event (e.g., including performance information relating to the component service associated with the event and/or the machine associated with the event), and/or may navigate to a system-level dashboard associated with the component service associated with the event (e.g., similar to that of dashboard 200 of FIG. 2) and/or a machine-level dashboard associated with a machine associated with the event (e.g., similar to that of dashboard 300 of FIG. 3). The most recent events may be listed at the top of the list. Recent events are described in more detail below with regard to at least the list of recent events 210 of dashboard 200 of FIG. 2.

Accordingly, an IT specialist may be able to assess the health of individual component services by a quick visual inspection of the tiles 102A-102M for the component service in a service-level dashboard. Further, the IT specialist may be able to assess the overall health of a service as a whole by a quick visual inspection of some or all of the tiles 102A-102M of the service-level dashboard.

Figure 2:
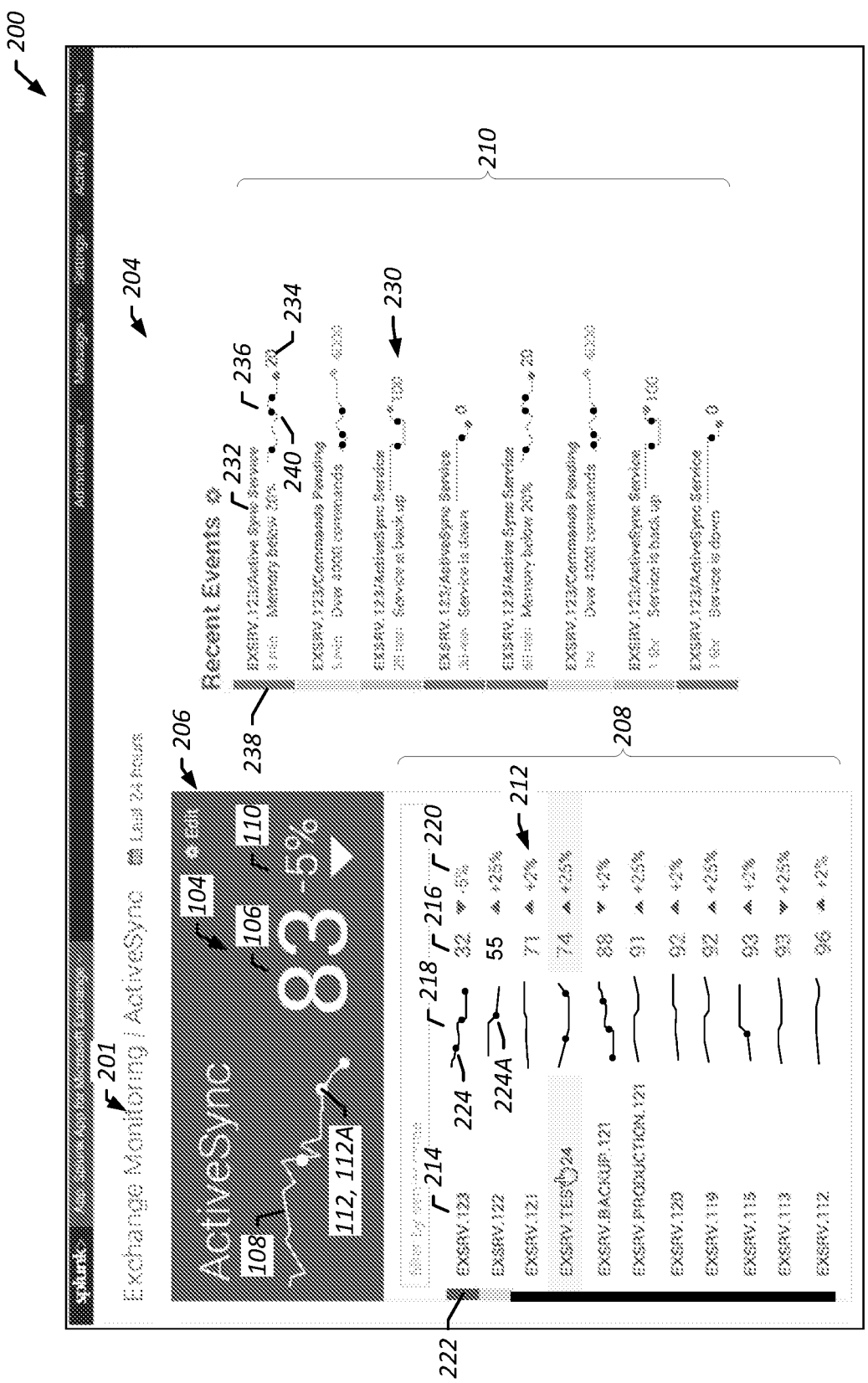
FIG. 2 illustrates an example system-level dashboard in accordance with the disclosed embodiments.

FIG. 2 illustrates an example system-level dashboard 200 in accordance with the disclosed embodiments. A system-level dashboard 200 for a particular component service may be displayed, for example, in response to a user selecting, e.g., clicking-on, the tile 102C in the service-level dashboard that corresponds to the component service. That is, a user may drill-down into the system-level dashboard 200 for a particular component service by selecting the component service's tile, such as 102C, in the service-level dashboard 100. For example, a user may drill-down to the ActiveSync system-level dashboard 200 of FIG. 2 by clicking-on the ActiveSync tile 102C of the Microsoft Exchange service-level dashboard 100 of FIG. 1A. The user may return to the Microsoft Exchange Overview (e.g., the service-level dashboard 100) by clicking on the "Exchange Monitoring" link 201.

The system-level dashboard 200 may display performance information 204 indicative of the health of a particular component service. For example, in the illustrated embodiment, the system-level dashboard 200 may display performance information indicative of the health of the ActiveSync component service of the Microsoft Exchange™ service. In some embodiments, the performance information 204 may be indicative of the health of one or more machines (or hosts) employed by, or otherwise associated with, the component service. For example, in the illustrated embodiment, the system-level dashboard 200 may include performance information 204 indicative of the health of one or more servers (or hosts) (e.g., servers "EXSRV.123", "EXSRV.122", and so forth) employed by, or otherwise associated with, the ActiveSync component service of the Microsoft Exchange™ service.

In some embodiments, a system-level dashboard 200 can include a component service tile 206, a listing of machines 208, and a listing of recent events 210. The component service tile 206 may include performance information 104 relating to the health of the particular component service. The listing of machines 208 may include performance information 204 relating to the health of individual machines (or hosts) employed by, or otherwise associated with, the component service. The listing of recent events 210 may include performance information 204 relating to events for the listed machines that can be indicative of a machine's performance (e.g., transitions of metric scores across a threshold value, from one state to another).

The ActiveSync system-level dashboard 200, for example, may include a component service tile 206 that includes performance information 104 relating the health of the ActiveSync component service, a listing of machines 208 including a listing of the servers (or hosts) (e.g., servers EXSRV.123, EXSRV.122, and so forth) employed by, or otherwise associated with, the ActiveSync service (accompanied by performance information for the respective server), and a list of recent events 210 for the servers (or hosts) (e.g., a list of recent events 210 for the servers EXSRV.123, EXSRV.122, and so forth).

The component service tile 206 of the system-level dashboard 200 may have the same or similar characteristics of a corresponding tile, such as 102C, of the service-level dashboard 100. For example, the tile 206 may include may include the composite service score 106, the plot (or spark-line) 108 (e.g., including transition markers 112), and the change value 110 of the corresponding tile 102, and may be color coded based on the same or similar conditions as the corresponding tile 102. Thus, component service tile 206 (of the system-level dashboard 200) for a component service may look the same as, and/or have the same information as, the corresponding component service tile, such as 102C, (of the service-level dashboard 200).

Each entry 212 of the listing of machines 208 may include a machine identifier 214, a composite machine score 216 (e.g., a score of 0-100), a plot (or spark-line) 218, a change value 220, and a traffic-light 222 (e.g., a colored block). The machine identifier 214 may include a name or similar identifier for the corresponding machine. The composite machine score 216 may represent a health of the respective machine. The plot (or spark-line) 218 may illustrate the recent history of the composite machine score 216. The change value 220 may represent the change of the composite machine score 216 over a given period (e.g., the percent change between the last determined composite service score and the current determined composite service score). The traffic-light 222 may correspond to the state, or status, of the machine (e.g., a colored block that is green, yellow or rec based on the current status for the machine being "OK", "moderate" or "critical", respectively). In some embodiments, the plot (or spark-line) 218 may include transition markers 224 and/or may be color-coded as discussed in more detail below with regard to at least FIG. 4.

In some embodiments, the traffic-light 222 and/or the composite machine score 216 may be color-coded to provide a visual indication of the machine's health. For example, the traffic-light 222 and/or the composite machine score 216 may be green in color if the corresponding machine component is operating normally, or has an "OK" status (e.g., the composite machine score 216 is within an acceptable range), the traffic-light 222 and/or the composite machine score 216 may be yellow in color if the corresponding machine component is operating with some issues, or has a "moderate" status (e.g., the composite machine score 216 is within a moderate range), and the traffic-light 222 and/or the composite machine score 216 may be red in color if the corresponding machine component is operating with some major issues, or has a "critical" status (e.g., the composite machine score 216 is within a critical range). In the illustrated embodiment, for example, the traffic-light 222 and the composite machine score 216 for the EXSRV.123 server may be red in color because the EXSRV.123 has a composite machine score of "32" which falls within a "critical" range for that machine. The traffic-light 222 and the composite machine score 216 for the EXSRV.122 server may be yellow in color because the EXSRV.123 server has a composite machine score of "55" which falls within a "moderate" range for that machine. The traffic-lights 222 and the composite machine scores 216 for the other servers (e.g., servers EXSRV.121, EXSRV.124, and so forth) may be green in color because each of the servers has a composite machine score that falls within an acceptable, or "OK," range for the corresponding machine. Calculation of the metric scores and the respective metric values are discussed in more detail below with regard to at least FIGS. 3 and 6-8.

In some embodiments, the default view for a system-level dashboard 200 can include the entries for machines with the worst status being provided at the top of the listing of machines 208. For example, in the illustrated embodiment, the entry 212 at the top of the list includes the EXSRV.123 server having a "critical" status, the second entry 212 includes the EXSRV.122 server having a "moderate" status, and all of the other (lower) entries (e.g., for servers EXSRV.121, EXSRV.124, and so forth) each have an acceptable or "OK" status.

The list of recent events 210 may include a listing of individual events 230 corresponding to a transition of one of the metrics (e.g., from one state to another) for a machine associated with the component service. For example, each machine's composite score 216 may be calculated based at least in part on underlying metric values for the machine. In the case of a server, for example, the machine metrics may include Memory Available, Commands Pending, CPU Utilization, Network Utilization, and ActiveSync Service (see, e.g., FIG. 3). Moreover, each of these metrics may have associated thresholds. The metric thresholds may have any suitable values. They may be calculated or selected individually by a user, for example, based on recommended thresholds. For example, the Memory Available may have a first (critical) threshold at 30 MB (24%) (e.g., a metric score of 24) and a second (moderate) threshold at 100 MB (80%) (e.g., a metric score of 90). A metric score above 90 may indicate that the Memory Available is in an "acceptable" or "OK" state, a metric score from 24-89 may indicate that the Memory Available is in an "moderate" state, and metric score below 24 may indicate that the Memory Available is in a "critical" state. Referring again to the list of recent events 210, a recent event may be created when a machine metric crosses a threshold, transitioning from one state, or status, to another. For example, a threshold event (or transition event), may be generated and recorded when the Memory Available for the EXSRV.123 server changes from about 50 MB (40%) to about 13 MB (10%). A recent event 230 in the listing may include a description of the event 232, an event metric score 234, a plot (or spark-line) 236, and a traffic light 238. The description of the event 232 may include an event description including, for example, an identifier of the machines associated with the event and/or a description of the event (e.g., "EXSRV.123/ActiveSyncService, Memory below 20%, 3 min"). An event metric score 234 may correspond to the metric score at or near the time of the event (e.g., the Memory Available score of "20" that triggered the event). A plot (or spark-line) 236 may illustrate the recent history of the metric score 234. In some embodiments, the plot (or spark-line) 218 may include transition markers 240 and/or may be color-coded as discussed in more detail below with regard to at least FIG. 4. The traffic light 238 for a threshold event may correspond to the status of the corresponding machine metric as a result of the event. For example, the traffic light 238 for the EXSRV.123/ActiveSyncService event 230 may be red in color because the event included a transition to a "critical" status (e.g., memory below 20%). In some embodiments, the most recent events 230 can be listed at the top of the listing of events 210 (e.g., listing in order of newest to oldest events).

Accordingly, an IT specialist may be able to assess the health of the individual machines of a component service by a quick visual inspection of the listing of machines 208. Further, the IT specialist may be able to assess the overall health of the component service as a whole by a quick visual inspection of the component service tile 206, the listing of machines 208, and/or the listing of recent events 210 displayed in the service-level dashboard 204.

Figure 3:
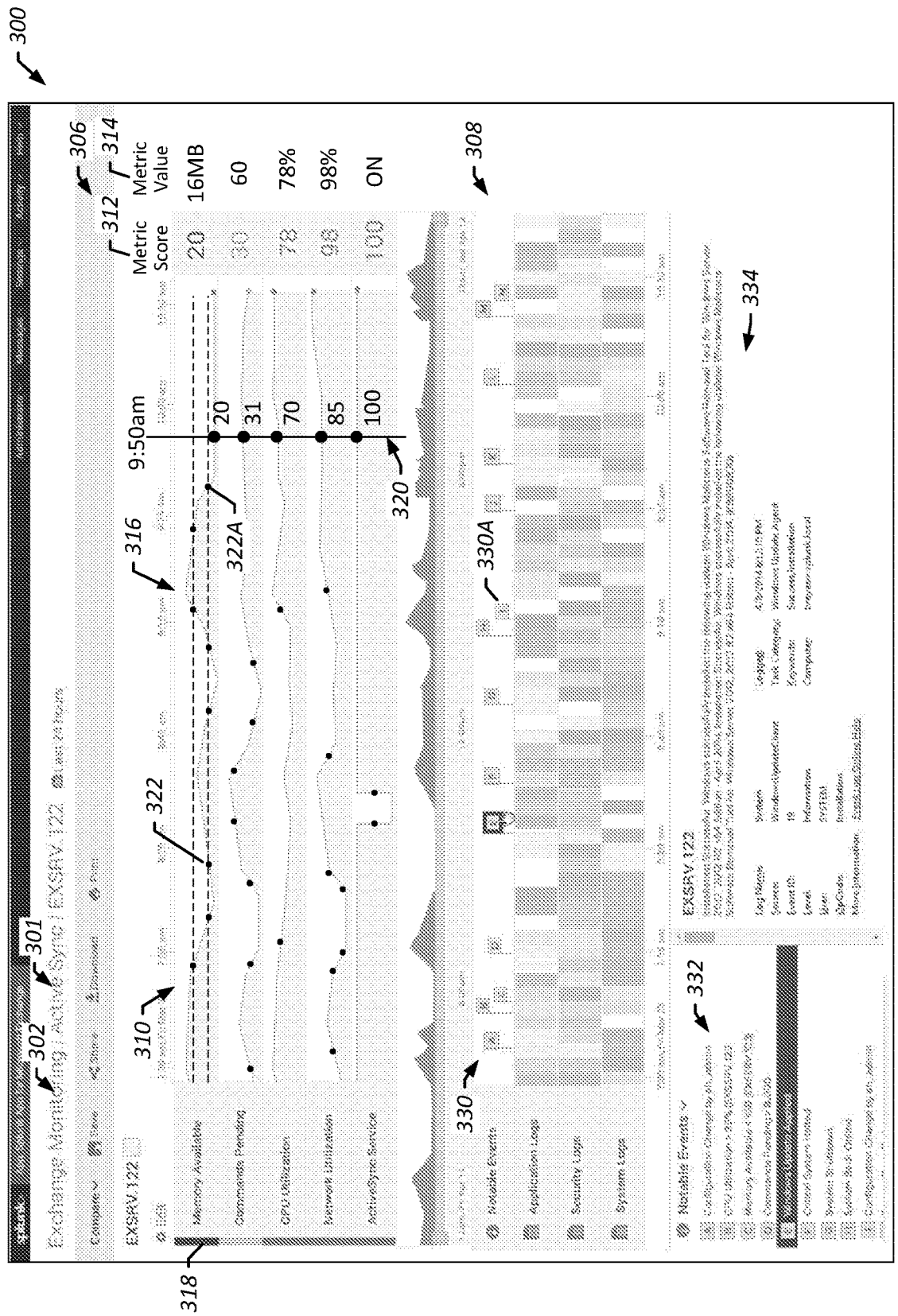
FIG. 3 illustrates an example machine-level dashboard in accordance with the disclosed embodiments.

FIG. 3 illustrates an example machine-level dashboard 300 in accordance with the disclosed embodiments. A machine-level dashboard 300 for a particular machine may be displayed, for example, in response to a user selecting, e.g., clicking-on, an entry 212 for the machine in the listing of machines 208 displayed in the system-level dashboard 200. That is, a user may drill-down into the machine-level dashboard 300 for a particular machine by selecting the machine's entry 212 in the system-level dashboard 200. For example, a user may drill-down to the EXSRV.122 machine-level dashboard 300 of FIG. 3 by clicking-on the EXSRV.122 entry 212 of the listing of machines 208 in the ActiveSync system-level dashboard 200 of FIG. 2. The user may return to the ActiveSync system-level dashboard 200 of FIG. 2 by clicking on the "ActiveSync" link 301, or the user may return to the Microsoft Exchange Overview (e.g., the service-level dashboard 100) by clicking on the "Exchange Monitoring" link 302. In some embodiments, a user can reorder the listing of machines 108 (e.g., via simple drag-and-drop of the machine elements 212 within the listing).

The machine-level dashboard 300 may display performance information indicative of the health of a particular machine, including information relating to different metrics for the machine. The performance information of the machine-level dashboard 300 may include a Deep-Dive panel 306 and a Heat Map panel 308.

The Deep-Dive panel 306 may include performance information 310 relating to the various monitored metrics for the machine (e.g., Memory Available, Commands Pending, CPU Utilization, Network Utilization, and ActiveSync Service). The Deep-Dive panel 306 may include, for each monitored metric, a metric score 312, a metric value 314, a plot 316, and a traffic light 318. The metric score 312 may be a score in a suitable range (e.g., a range of 0-100) based on an actual value for the metric. The metric value 314 may represent an actual value for the metric. A plot 316 may illustrate the history of the metric score 312, and a traffic light 318 may corresponding to the current state, or status, of the metric (e.g., a colored block that is green, yellow or red based on the current status of the metric being acceptable, moderate or critical, respectively). Calculation of the metric scores 312 and the respective metric values 314 are discussed in more detail below with regard to at least FIGS. 6 and 7.

In some embodiments, the plot 316 may include an inspection line 320. The inspection line 320 may be movable by a user to determine the various metric values associated with a given point in time. For example, in the illustrated embodiment, the inspection line 320 is positioned at 9:50 am and depicts metric values of 20, 31, 70, 85 and 100 for the Memory Available, Commands Pending, central processing unit (CPU) Utilization, Network Utilization, and ActiveSync Service metrics, respectively. In some embodiments, the plot 316 can include transition markers 322 and/or may be color-coded as discussed in more detail below with regard to at least FIG. 4. For more details about such Deep-Dive panels, see U.S. Patent Application No. 62/062,104, filed Oct. 9, 2014 and titled "MONITORING SERVICE-LEVEL PERFORMANCE USING KEY PERFORMANCE INDICATORS DERIVED FROM MACHINE DATA", which is hereby incorporated herein by reference in its entirety for all purposes.

The Heat Map panel 308 may include a visual representation of the number and types of events that occur at particular segments of time. The heat map panel 308 may include a multi-lane time-synched visualization of machine data event. For example, a darker box may illustrate a relatively high number of events occurring during the corresponding time period. For more details about such Heat Map panels (e.g., multi-lane time-synched visualization of machine data event), see U.S. Pat. No. 8,806,361, issued Aug. 12, 2014 and titled "MULTI-LANE TIME-SYNCHED VISUALIZATIONS OF MACHINE DATA EVENTS", which is hereby incorporated herein by reference in its entirety for all purposes. In some embodiments, the Heat Map panel 308 can include indicators (e.g., flags) 330 corresponding to the occurrence of a "notable event." A notable event may include a point at which one or more predefined conditions are met. For example, if a user sets a notable event to be generated when the CPU utilization exceeds about 65%, for the server EXSRV.122 and the CPU utilization increases above 65% at about 9:10 am, then, a notable event "I" indicative of the event (e.g., the CPU utilization increases above 65%) may be generated and a corresponding indicator (e.g., flag "I" 330A) may be displayed at a location corresponding to about 9:10 am. Although notable events and corresponding indicators are illustrated in the heat map 308, embodiments may include such indications provided in any suitable location. For example, the row (or lane) of notable events may be provided as the top row (or lane) of the Deep-Dive Panel 306 (e.g., above the "Memory Available" row (or lane). In some embodiments, a listing of notable events 332 may be provided. The listing 332 may include details regarding each of the listed notable events. Upon selection of a notable event in the listing of notable events 332, or a corresponding indicator 330, a notable event information window 334 may be populated with detailed information about the notable event.

Accordingly, an IT specialist may be able to assess the health of the individual metrics for an individual machine of a component service by a quick visual inspection of the Deep-Dive Panel 306, and/or the Heat Map panel 308 displayed in the machine-level dashboard 300.

Figure 4:
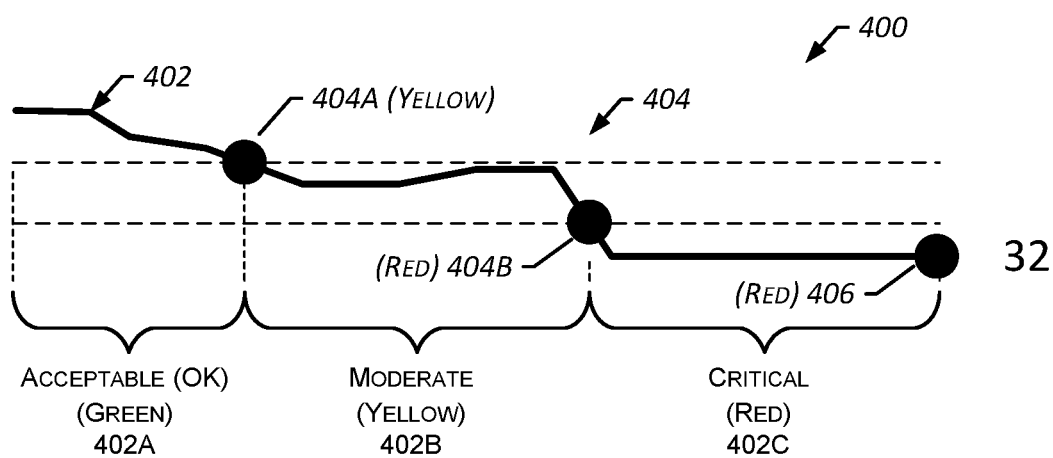
FIG. 4 illustrates an example plot in accordance with the disclosed embodiments.

FIG. 4 illustrates an example plot 400 in accordance with one or more embodiments. Plot 400 may include features that can be employed with regard to plots 108 of tiles 102A-102M of the service-level dashboard 100, plot 108 of the tile 206 of the system-level dashboard 200, plots 218 of the listing of machines 208 of the system-level dashboard 200, plots 236 of the list of recent events 210 of the system-level dashboard 200, plots of the list of recent events 114 of the service-level dashboard 100, and plots 316 of the Deep Dive panel 306 of the machine-level dashboard 300.

As illustrated, the plot 400 may include a plot line 402 and markers 404. A plot line may include a graphical illustration of a value over time. For example, in the illustrated embodiment, the plot line 402 may represent a value that generally decreases over time to a final value of "32". In some embodiment, the plot line 402 can be divided into multiple segments that represent a period when the value is within a given range (e.g., the value falls within a range that corresponds to a particular status based on defined threshold values). For example, the illustrated embodiment can include a first-upper dashed line corresponding to a moderate threshold value e.g., "80"), and a second-lower dashed line corresponding to a critical threshold value (e.g., "40"). The threshold markers (or transition markers) 404 can include dots (or other graphical symbols) that signify a location on the plot line 402 when the value was equal to or crossed a threshold value (e.g., where the value transitions from one status range to another status range). For example, in the illustrated embodiment, a first threshold marker 404A may be located at a point on the plot line 402 where the plotted value crosses the moderate threshold value (e.g., "80"), thereby transitioning from a first value range (e.g., an acceptable status or score range) into a second value range (e.g., a moderate status or score range). The second threshold marker 404B may be located at a point on the plot line 402 where the plotted value crosses the critical threshold value (e.g., "40"), thereby transitioning from the second value range (e.g., a moderate status or score range) into a second value range (e.g., a critical status or score range). An end maker 406 may be located at the end point on the plot line 402, thereby representing the current value at the end of the plot line 402 (e.g., a current value of "32"). In some embodiments, the plot line 402 and/or markers 404 and 406 may be color-coded based on the current value. For example, the entire plot line 402 and/or markers 404 and 406 may be colored "red" based on the current value for the being plotted falling into the critical value range. In some embodiments, segments and/or markers of the plot line 402 may be color coded based on values associated with the segment. For example, a first segment 402A of the plot line 402 may be green in color because the values for that segment fall within the acceptable range (e.g., the value are above the moderate threshold value of "80"), a second segment 402B of the plot line 402 may be yellow in color because the values for that segment fall within the moderate range (e.g., the value fall in the range including the moderate threshold value of "80" and the critical threshold value of "32"), and a third segment 402C of the plot line 402 may be red in color because the values for that segment fall within the critical range (e.g., the value are at or below the critical threshold value of "80"). In some embodiments, the threshold markers 404 can correspond to the resulting range to which the value transitions. For example, the first threshold marker may be yellow in color because at that point, the plot line 402 transitioned from the acceptable range (e.g., represented by a green color) into the moderate range (e.g., represented by a yellow color). The second threshold marker 404B may be red in color because at that point, the plot line 402 transitioned from the moderate range (e.g., represented by a yellow color) into the critical range (e.g., represented by a red color). The end marker 406 may have a color corresponding to its value. For example, the end marker 406 may be red in color because the value at that point (e.g., "32") falls into the critical range (e.g., represented by a red color).

Although the above example embodiments have been described with reference to a generic example plot 400 for the purpose of illustration, it will be appreciated that such a technique may be applied to the variety of different plots described herein, including plots 108 of tiles 102A-102M of the service-level dashboard 100, plot 108 of the tile 206 of the system-level dashboard 200, plots 218 of the listing of machines 208 of the system-level dashboard 200, plots 236 of the list of recent events 210 of the system-level dashboard 200, plots of the list of recent events 114 of the service-level dashboard 100, and plots 316 of the Deep Dive panel 306 of the machine-level dashboard 300. For example, with regard to plots 108 of tiles 102A-102M of the service-level dashboard 100, and plot 108 of the tile 206 of the system-level dashboard 200, the respective plots 108 may have color-coded plot lines, color-coded threshold markers, and/or color-coded end markers having colors that correspond to the values and transitions of the component service score that is plotted and any corresponding threshold values that have been defined for the component service score, and/or may have color-coded plot lines, color-coded threshold markers, and/or color-coded end markers having colors that correspond to the transitions of the machine composite score at the respective times and any corresponding threshold values that have been defined for the machine composite score. With regard to the plots 218 of the listing of machines 208 of the system-level dashboard 200, the respective plots 218 may have color-coded plot lines, color-coded threshold markers, and/or color-coded end markers having colors that correspond to the values and transitions of the machine composite score that is plotted and any corresponding threshold values that have been defined for the machine composite score. With regard to the plots 236 of the list of recent events 210 of the system-level dashboard 200, the respective plots 236 may have color-coded plot lines, color-coded threshold markers, and/or color-coded end markers having colors that correspond to the values and transitions of the metric score that is plotted and any corresponding threshold values that have been defined for the metric score. With regard to the plots 316 of the heat map 306 of the machine-level dashboard 300, the respective plots 316 may have color-coded plot lines, color-coded threshold markers, and/or color-coded end markers having colors that correspond to the values and transitions of the metric score that is plotted and any corresponding threshold values that have been defined for the metric score.

In some embodiments, the performance information of the dashboards is dynamically updated to reflect current performance information. Thus, if streaming data is received in real-time and used to calculate the metric values in real time (e.g., that are the basis for the various values, scores, plots, traffic lights, and so forth), the displayed values of the dashboards may be dynamically updated to reflect changed in the various values, scores, plots, traffic lights, and so forth. For example, if a metric Memory Available metric for the EXSRV.115 server transitions from acceptable range into a critical range and the corresponding composite machine score changes to a critical range, the display of the system-level dashboard 200 may be updated dynamically such that the plot 218, the composite machine score 216 and the change value 220 for of entry 212 for the EXSRV.115 server are updated to reflect the new composite machine score, the entry EXSRV.115 may be promoted to the first or second entry in the listing of machines 208, and a new recent event 230 reflecting the transition of the Memory Available metric into a critical range may be generated and displayed at the top of the recent events list 210. Similarly, the performance information 104 of the tile 206 and/or the tile 102 for the ActiveSync component service may be dynamically updated to reflect the new scores and status. Such a dynamic updating may enable the dashboards 100, 200 and 300 to provide a real-time display of performance information to the user. The display of the dashboards 100, 200 and/or 300 is discussed in more detail below with regard to at least FIGS. 10A-10C.

Figure 5A:
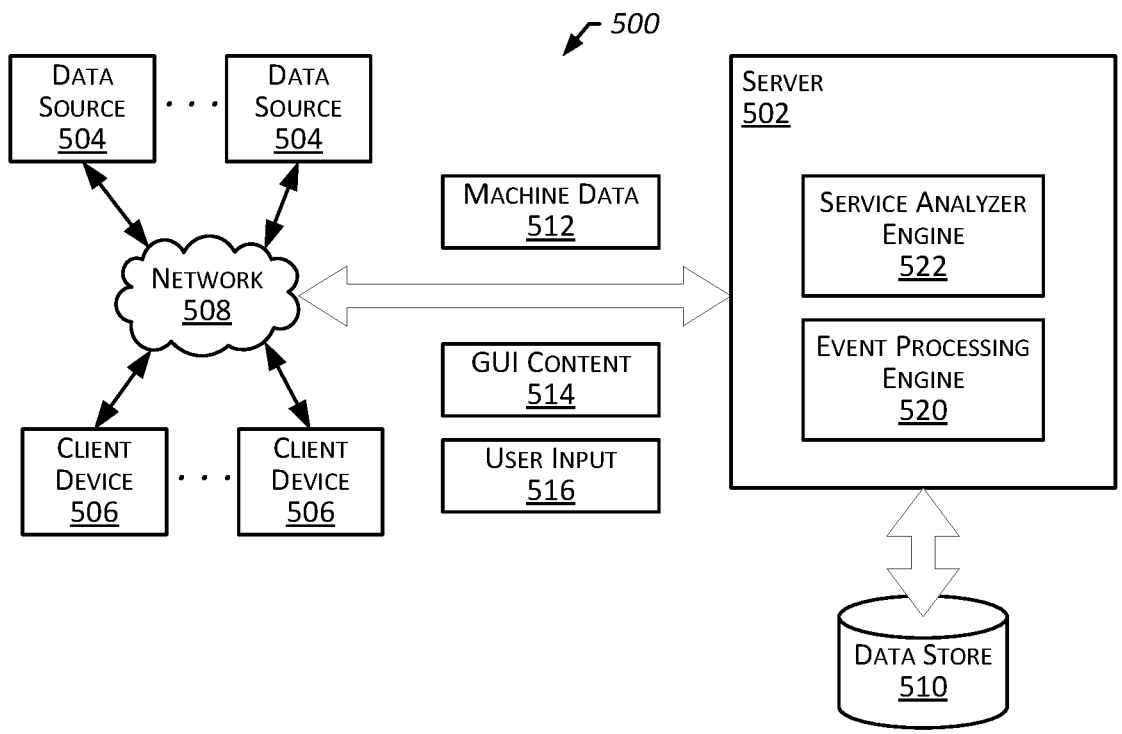
FIG. 5A is a block diagram of an example performance monitoring environment in accordance with the disclosed embodiments.

FIG. 5A is a block diagram of an example performance monitoring environment ("environment") 500 in accordance with the disclosed embodiments. Environment 500 can include a server 502, one or more data sources 504, and/or one or more client devices 506 communicatively coupled via a network 508. The server 502 may include or otherwise have access to a data store 510.

The network 508 may include an element or system that facilitates communication between entities of the environment 500 (e.g., including the server 502, the data sources 504, and/or client devices 506). For example, the network 508 may include an electronic communications network, such as the Internet, a local area network ("LAN"), a wide area network ("WAN"), a wireless local area network ("WLAN"), a cellular communications network, and/or the like. In some embodiments, the network 508 can include a wired or a wireless network. In some embodiments, the network 508 can include a single network or a combination of networks.

The client devices 506 may include any variety of electronic devices, such as computer devices. In some embodiments, a client device 506 can include a device capable of communicating information via the network 508. A client device 506 may include one or more computer devices, such as a desktop computer, a server, a laptop computer, a tablet computer, a personal digital assistant (PDA), a smart phone, and/or the like. In some embodiments, a client device 506 may be a client of the server 502. In some embodiments, a client device 506 may include various input/output (I/O) interfaces, such as a graphical user interface (e.g., a display screen), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a stylus or the like), and/or the like. In some embodiments, a client device 506 may include general computing components and/or embedded systems optimized with specific components for performing specific tasks. In some embodiments, a client device 506 can include programs/applications that can be used to generate a request for content, to provide content, to render content, and/or to send and/or receive requests to and/or from other devices via the network 508, such as client applications used for communicating with the server 502. For example, a client device 506 may include an Internet browser application that facilitates communication with other entities of the environment 500 via the network 508. In some embodiments, a program, or application, of a client device 506 can include modules having program instructions that are executable by a computer system to perform some or all of the functionality described herein with regard to at least the client devices 506. In some embodiments, a client device 506 can include one or more computer systems similar to that of computer system 2000 described below with regard to at least FIG. 18.

The data sources 504 may include one or more external data sources, such as servers, computers, routers, databases, operating systems, applications and/or the like that provide machine data 512. The machine data 512 may include raw data, which can include unstructured data, machine data, performance measurements or other time-series data, such as data obtained from weblogs, syslogs, or sensor readings. In some embodiments, the machine data 512 can include data provided by an operating system's performance software executing on a machine, and/or provided by a hypervisor (or virtual machine monitor (VMM)) associated with a virtual machine. In the context of the Microsoft Exchange™ service, for example, a Windows Performance Monitor application may provide over 200 parameters (or "counters") that are indicative of system performance. In some embodiments, a data source 504 is the same or similar to the data sources 1105 described below with regard to at least FIG. 11.

The server 502 may include any computing devices having network connectivity and capable of providing one or more services to network clients, such as the client devices 506 and/or the data sources 504. These services may include storage and/or processing of data. The server 502 may serve client requests received from the user devices 108 by processing the requests, searching, or querying, the data store 510 to identify search results, serving content (e.g., graphical user interface (GUI) content 514) corresponding to the search results to client devices 506 and/or process user input 516 (e.g., user selection of a portion of the displayed content 514).

In at least certain embodiments, the server 502 can be a high performance, scalable server configured to index and search machine data in real time. The server 502 may be operable with data generated by any application, server, or data processing device and can be configured to access, process, and index streaming machine data and also handle search requests. In addition, the server 502 can include an application server providing web interface adapted to search and navigate IT data and to manage deployment of applications through a browser interface. The server 502 may include an external communication interface configured to receive streams of machine data 512 from a plurality of different data sources 504 via network 508. Although certain embodiments are described with regard to a single server for the purpose of illustration, embodiments may include employing multiple servers, such as a plurality of distributed servers. In some embodiments, the server 502 can include one or more computer systems similar to that of computer system 2000 described below with regard to at least FIG. 18.

The data store 510 may include a medium for the storage of data thereon. For example, the data store 510 may include a non-transitory computer-readable medium storing data thereon that is accessible by various entities of the environment 500, such as server 502. Although certain embodiments are described with regard to a single data store 510 for the purpose of illustration, embodiments may include employing multiple data stores 510, such as a plurality of distributed data stores 510. In some embodiments, a data store 510 is the same or similar to the data stores 1103 described below with regard to at least FIG. 11.

In some embodiments, the server 502 can include an event processing engine 520, and/or and a service analyzer engine 522. The event processing engine 520 may provide for the receipt of machine data 512, the processing of machine data 512 (e.g., minimal processing to identify events contained in or otherwise associated with the machine data 512) the storage of corresponding data (e.g., the storage of the identified events in data store 510) and/or performing searching of the stored data to identify search results (e.g., events) responsive to a search query. For example, the event processing engine 520 may receive machine data 512 from one or more of the data sources 504, the event processing engine 520 may conduct minimal processing on the machine data 512, and may store the minimally processed machine data 512 in the data store 510. The machine data 512 received (or the minimally processed machine data 512) can be provided, for example, to the service analyzer engine 522 for use in generating corresponding performance information that can be used, for example, to populate dashboards 100, 200 and/or 300. In some embodiments, the event processing engine 520 may be the same or similar to the event processing system 1000 described below with regard to at least FIG. 11.

The service analyzer engine 522 may provide for the generation and display of graphical user interfaces (GUI) for presenting service performance information to users. For example, the service analyzer engine 522 may identify and/or generate performance information (e.g., including calculating metric values, metric scores, composite machine scores, and composite component service scores based on machine data 512, such as counters for the Microsoft Exchange™ component service machines provide by the Windows Performance Monitor application and/or events returned from a search conducted by event processing system 520), generate dashboards 100, 200 and/or 300 including the performance information, and serve GUI content 514 including the dashboard 100, 200 and/or 300 to a client device 506 for display to a user. In some embodiments, the service analyzer engine 522 may process the user input 516 received from a client device 506 (e.g., selection of an element of a dashboard, such as a component service tile 102 of a service-level dashboard 100), and may identify and serve corresponding GUI content 514 (e.g., system-level dashboard 200 for the selected component service tile 102) to the client device 506 for display to a user.

Figure 5B:
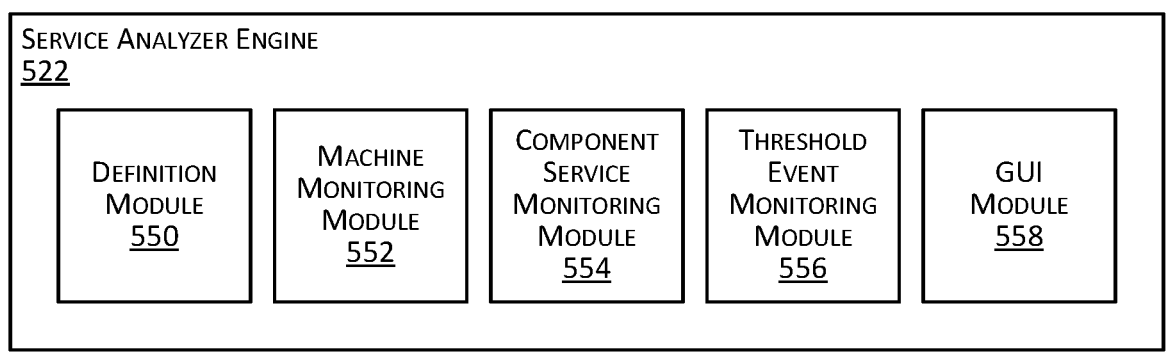
FIG. 5B is a block diagram that illustrates example modules of a service analyzer engine in accordance with the disclosed embodiments.

FIG. 5B is a block diagram that illustrates example modules of service analyzer engine 522 in accordance with the disclosed embodiments. Service analyzer engine 522 may include for example, a definition module 550, a machine monitoring module 552, a component service monitoring module 554, a threshold event monitoring module 556, and a graphical user interface (GUI) module 558. Each of the modules may include software modules that can be employed to perform some or all of the functionality of the service analyzer engine 522 as described herein (e.g., with regard to at least FIGS. 6-10C).

Figure 6:
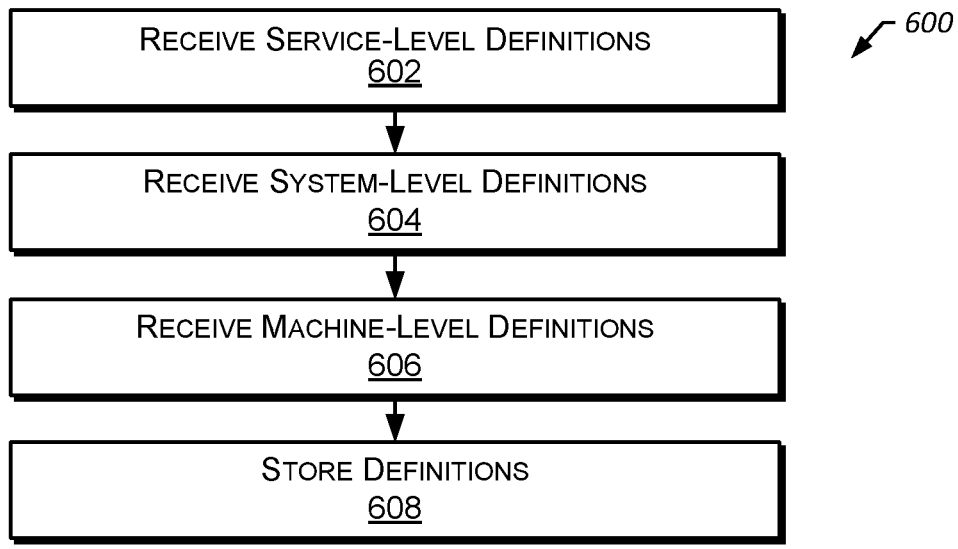
FIG. 6 is a flowchart that illustrates an example method for defining a service in accordance with the disclosed embodiments.

FIG. 6 is a flowchart that illustrates an example method 600 for defining a service in accordance with the disclosed embodiments. Some or all of the aspects of method 600 may be performed by the definition module 550. In some embodiments, method 600 may be performed, for example, to define the what component services are to be included in a service, what machines are to be included in the component services, what metrics are to be monitored for the machines, how the metrics are calculated, how the composite machine scores are calculated, how the composite component service scores are calculated, and/or the various threshold values and ranges for the various scores and values. Although certain embodiments are described in the context of user input to define a service, in some embodiments, the definitions can be pre-defined. For example, a set of predefined definitions may be provided for the Microsoft Exchange service. Thus, a user may not need to provide the definitions for the service, and/or can create a custom definition for a service by simply modifying the pre-existing definitions for the service.

In some embodiments, receiving service level definitions (block 602) can include the definition module 550 receiving selection of one or more component services to be included in a service. In the context of defining the Microsoft Exchange™ service (e.g., of dashboard 100 of FIG. 1A), for example, receiving service level definitions can include the definition module 550 receiving user selection of the Outlook RPC component service, the Outlook Web Access component service, the ActiveSync component service, and so forth.

In some embodiments, receiving system-level definitions (block 604) can include the definition module 550 receiving selection of one or more machines to be included in each of the component services included in the service. In the context of defining the ActiveSync component service of the Microsoft Exchange™ service (e.g., of dashboard 200 of FIG. 2), for example, receiving system-level definitions can include the definition module 550 receiving user selection of the EXSRV.123 server, the EXSRV.122 server, and so forth.

In some embodiments, receiving system-level definitions (block 604) can include the definition module 550 receiving definitions for how the composite component service scores are to be calculated. In the context of defining the composite component service score for the ActiveSync component service of the Microsoft Exchange™ service, for example, receiving system-level definitions can include the definition module 550 receiving user input specifying that the composite component service score is an average (e.g., an un-weighted average or a weighted average) of the composite machine scores for each of the machines included in the ActiveSync component service. A similar definition may be provided for the composite component service score for each of the other component services of the Microsoft Exchange™ service.

In some embodiments, receiving machine-level definitions (block 606) can include the definition module 550 receiving user selection of one or more elements (or metrics) to be monitored for each of the machines included in the component services included in the service. In the context of defining the EXSRV.122 server of the ActiveSync component service of the Microsoft Exchange™ service (e.g., of dashboard 300 of FIG. 3), for example, receiving machine-level definitions (block 606) can include the definition module 550 receiving user selection of the machine metrics including Memory Available, Commands Pending, CPU Utilization, Network Utilization, and ActiveSync Service.

In some embodiments, receiving machine-level definitions (block 606) can include the definition module 550 receiving definitions for how the composite machine scores are to be calculated. In the context of defining the composite machine score for the EXSRV.122 server of the ActiveSync component service of the Microsoft Exchange™ service, for example, receiving machine-level definitions can include the definition module 550 receiving user input specifying that the composite machine score is an average (e.g., an un-weighted average or a weighted average) of the monitored metric scores. A similar definition may be provided for the composite machine score for each of the other machines of the component services of the Microsoft Exchange™ service.

In some embodiments, receiving machine-level definitions (block 606) can include the definition module 550 receiving definitions of thresholds for the monitored metrics. In the context of defining the threshold for the Memory Available metric score for the EXSRV.122 server of the ActiveSync component service of the Microsoft Exchange™ service, for example, receiving machine-level definitions can include the definition module 550 receiving user input specifying a first (critical) threshold at a metric score of 24 (e.g., when the memory available is about 30 MB (24%)) and a second (moderate) threshold at a metric score of 90 (e.g., when the memory available is about 100 MB (80%)). Although two thresholds are discussed for the purpose of illustration, any number of thresholds may be provided. A similar definition may be provided for each of the monitored metrics for the EXSRV.122 server and each of the other machines of the component services of the Microsoft Exchange™ service. In some embodiments, a threshold value may be set or selected based on recommendation, such as those provide by Microsoft with regard to the Microsoft Exchange™ service. For example, the threshold may be selected based on Microsoft's recommendation that for the "Memory\Available" counter that suggests that the memory available "should remain above 100 MB at all times."

In some embodiments, receiving machine-level definitions (block 606) can include the definition module 550 receiving definitions of how to calculate scores for the monitored metrics. In the context of defining the a score for the Memory Available metric score for the EXSRV.122 server of the ActiveSync component service of the Microsoft Exchange™ service, for example, receiving machine-level definitions can include the definition module 550 receiving user input specifying that the score varies linearly from 0-100, with 0 corresponding to 0% (e.g., 0 MB) of the memory being available and with 100 corresponding to 100% (e.g., 100 MB) of the memory being available.

In some embodiments, receiving machine-level definitions (block 606) can include the definition module 550 receiving definitions of what parameter is used as the basis for the monitored metric. In the context of defining the a score for the Memory Available metric score for the EXSRV.122 server of the ActiveSync component service of the Microsoft Exchange™ service, for example, receiving machine-level definitions can include the definition module 550 receiving user input specifying that the "Memory\Available" counter is to be used as the basis for determining the metric value (e.g., the Memory available).

In some embodiments, the machine-level definitions may be specific to a particular combination of service, component service and/or machine. For example, a first set of thresholds may be defined for the Memory Available metric score for the EXSRV.122 server of the ActiveSync component service of the Microsoft Exchange™ service, but a different-second set of set of thresholds may be defined for the Memory Available metric score for the EXSRV.123 server of the ActiveSync component service of the Microsoft Exchange service. As a further example, a first set of thresholds may be defined for the Memory Available metric score for the EXSRV.122 server for the ActiveSync component service of the Microsoft Exchange™ service, but a different-second set of set of thresholds may be defined for the Memory Available metric score for the EXSRV.122 server for the Outlook RPC component service of the Microsoft Exchange™ service.

The definitions (e.g., the service level definitions, the system level definitions and/or the machine level definitions) may be stored (block 608), e.g., in a memory by the definition module 550.

Figure 7:
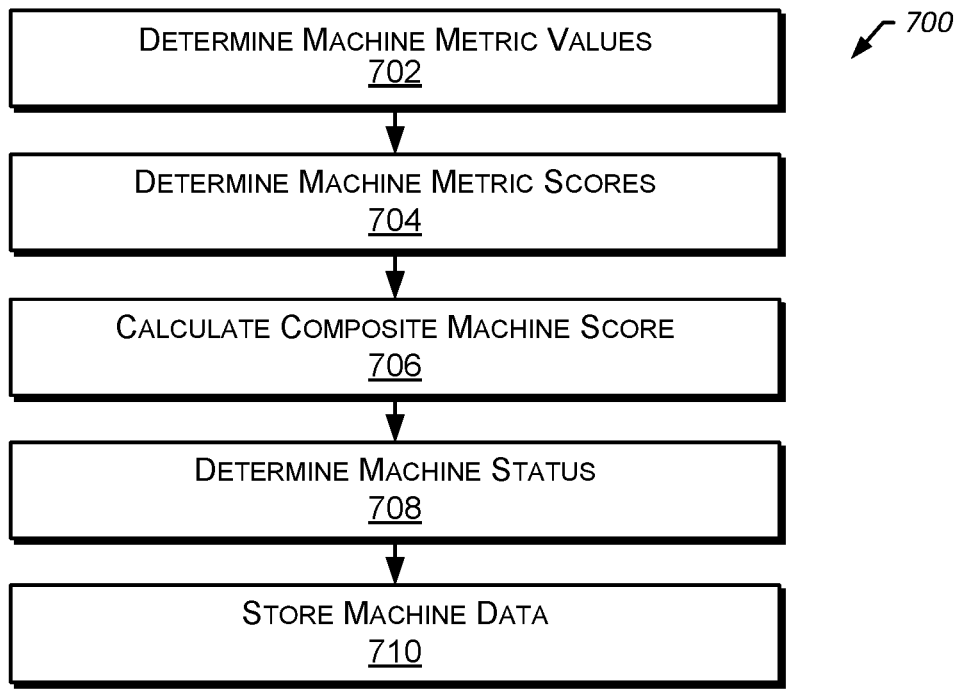
FIG. 7 is a flowchart that illustrates an example method for generating performance information for a machine in accordance with the disclosed embodiments.

FIG. 7 is a flowchart that illustrates an example method 700 for generating performance information for a machine in accordance with the disclosed embodiments. Some or all of the aspects of method 700 may be performed by the machine monitoring module 552. In some embodiments, determining machine metric values (block 702) can include calculating (or otherwise determining) a metric value for some or all of the monitored metrics for the machine based on the machine level definitions. In the context of determining a metric value for the Memory Available for the EXSRV.122 server of the ActiveSync component service of the Microsoft Exchange™ service, for example, determining machine metric values can include the machine monitoring module 552 determining the metric value of "16 MB" based on a "Memory\Available" counter provided by the Windows Performance Monitor application of the Microsoft Exchange™ service (e.g., see dashboard 300 of FIG. 3). Similar calculations (or determinations) may be performed for each of the other monitored metrics of the EXSRV.122 server and/or the other machines of the component services of the Microsoft Exchange™ service. In some embodiments, the machine metric may be determined directly from the performance information. For example, the counter may include the actual value used for the metric. In some embodiments, the machine metric may be determined indirectly from the performance information. For example, the counter may include the information (e.g., a value) that can be used to calculate, or otherwise determine, the metric value. For example, a look-up table or algorithm may be used to determine that a counter value such as "023041" (e.g., for the "Memory\Available" counter) corresponds to a metric value of "16 MB".

In some embodiments, determining machine metric scores (block 704) can include calculating (or otherwise determining) a metric score value for some or all of the monitored metrics based on the corresponding machine metric value and machine level definitions. In the context of determining a metric score for the Memory Available for the EXSRV.122 server of the ActiveSync component service of the Microsoft Exchange™ service, for example, determining machine metric scores can include the machine monitoring module 552 determining the metric score of "20" based on the metric value of "16 MB" (e.g., see dashboard 300 of FIG. 3). Similar calculations (or determinations) may be performed for each of the other monitored metrics of the EXSRV.122 server and/or the other machines of the component services of the Microsoft Exchange™ service.

In some embodiments, determining composite machine scores (block 706) can include calculating (or otherwise determining) a composite machine score based on metric score for some or all of the monitored metrics based and machine level definitions. In the context of determining a composite machine score for the EXSRV.122 server of the ActiveSync component service of the Microsoft Exchange™ service, for example, determining a composite machine score can include the machine monitoring module 552 determining the composite metric score of "55" (see, e.g., dashboard 200 of FIG. 2). The score may be a weighted average of the metric scores for the monitored metrics for the EXSRV.122 server (see, e.g., dashboard 300 of FIG. 3). Similar calculations (or determinations) may be performed for each of the other machines of the component services of the Microsoft Exchange™ service.

In some embodiments, determining machine status (block 708) can include determining a machine status (e.g., "OK", "moderate", or "critical") based on the composite machine score and the threshold for the composite machine score defined by the machine level definitions. In the context of the EXSRV.122 server of the ActiveSync component service of the Microsoft Exchange™ service, for example, determining a machine status can include the machine monitoring module 552 determining that the EXSRV.122 server has a "moderate" status because its machine composite score of "55" fall in a "moderate" range defined in the machine level definitions for the EXSRV.122 (e.g., dashboard 200 of FIG. 2). Similar determinations may be performed for each of the other machines of the component services of the Microsoft Exchange™ service.

The machine data (e.g., the metric values, the metric scores, the composite machine scores, and/or the machine statuses) may be stored (block 710), e.g., in a memory by the machine monitoring module 552.

Figure 8:
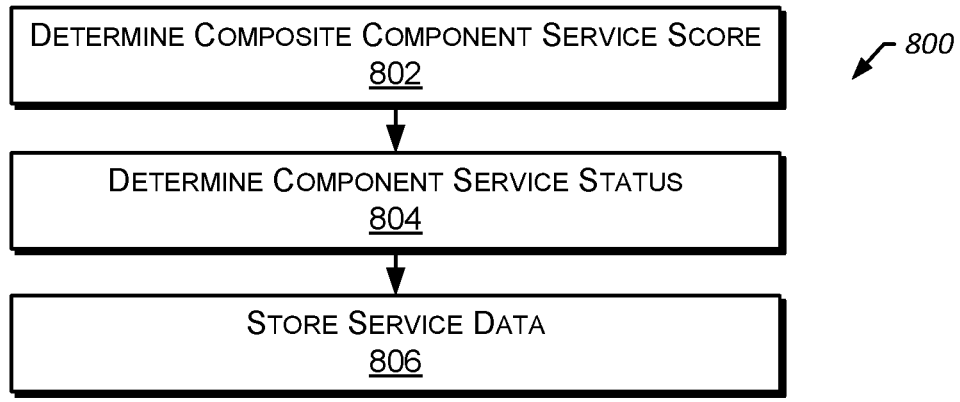
FIG. 8 is a flowchart that illustrates an example method for generating performance information for a component service in accordance with the disclosed embodiments.

FIG. 8 is a flowchart that illustrates an example method 800 for generating performance information for a component service in accordance with the disclosed embodiments. Some or all of the aspects of method 800 may be performed by the component service monitoring module 554. In some embodiments, determining composite component service scores (block 802) can include calculating (or otherwise determining) a composite component service score for a component service based on composite machine scores for the machines included in (or otherwise associated with) the component service (e.g., as defined in the system level definitions). In the context of determining a composite component service score for the ActiveSync component service of the Microsoft Exchange™ service, for example, determining a composite component service score can include the component monitoring module 554 determining the composite metric score of "83" (see, e.g., dashboard 200 of FIG. 2). The score may be a weighted average (or un-weighted average) of the composite machine scores for the EXSRV.123 server, the EXSRV.122 server, and so forth. Similar calculations (or determinations) may be performed for each of the other component services of the Microsoft Exchange™ service.

In some embodiments, determining component service status (block 804) can include determining a component service status (e.g., "OK", "moderate", or "critical") based on the lowest, or worst, status of the machines included in (or otherwise associated with) the component service. In the context of the ActiveSync component service of the Microsoft Exchange™ service, for example, determining a component service status can include the machine monitoring module 552 determining that the ActiveSync service has a "critical" status because at least one of its machines (e.g., the EXSRV.123 server) has a "critical" status. Similar calculations (or determinations) may be performed for each of the other component services of the Microsoft Exchange™ service.

The component service data (e.g., the composite component service scores and/or the component service statuses) may be stored (block 806), e.g., in a memory by the machine monitoring module 552.

Figure 9:
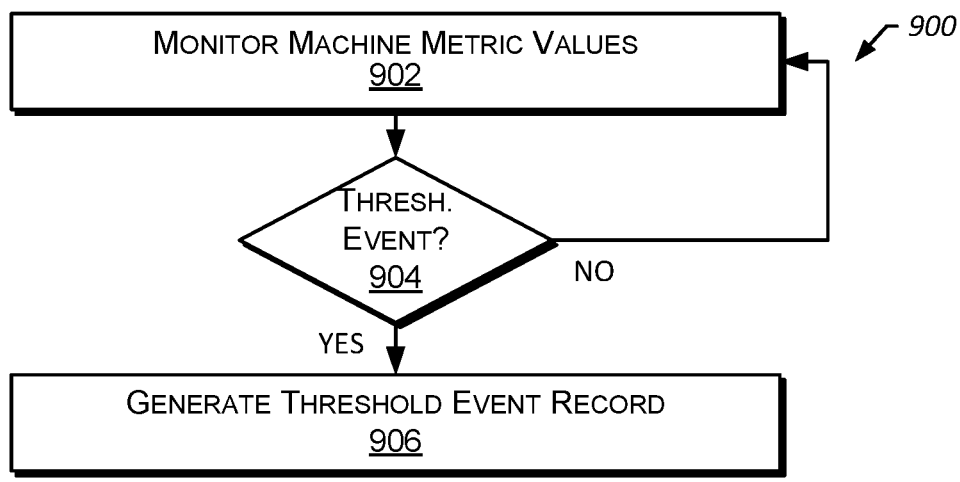
FIG. 9 is a flowchart that illustrates an example method for monitoring threshold events in accordance with the disclosed embodiments.

FIG. 9 is a flowchart that illustrates an example method 900 for monitoring threshold events in accordance with the disclosed embodiments. Some or all of the aspects of method 900 may be performed by the threshold event monitoring module 556. In some embodiments, monitoring machine metric values (block 902) includes monitoring the machine metric values (e.g., determined at block 702) to determine whether any of the machine metric values have crossed a defined threshold (e.g., as defined by machine level definitions). In response to determining that a threshold event has occurred, the method 900 may include generating a threshold event record (block 906). The threshold event record may be stored, e.g., in a memory by the threshold event monitoring module 556. In some embodiments, threshold markers may be displayed on plots at locations corresponding to the threshold event.

In the context of the Memory Available metric score for the EXSRV. 122 server of the ActiveSync component service of the Microsoft Exchange™ service, for example, if a threshold is defined (e.g., in the machine level definitions) specifying a first (critical) threshold at a metric score of 24 (e.g., when the memory available is about 30 MB (24%)) and a second (moderate) threshold at a metric score of 90 (e.g., when the memory available is about 100 MB (80%)), and the memory available metric score changes from "30" to "20", thereby crossing the threshold score of "24", the threshold event monitoring module 556 may generate (and store) a corresponding threshold event record. This threshold event may be illustrated as the threshold marker 322A of the plot 316 for the Memory Available metric of the EXSRV.122 server of the ActiveSync component service of the Microsoft Exchange™ service (see, e.g., dashboard 300 of FIG. 3), as the threshold marker 224A of the plot 218 for the EXSRV.122 server of the ActiveSync component service of the Microsoft Exchange™ service (see, e.g., dashboard 200 of FIG. 2), and/or the threshold marker 112A of the plot 108 for ActiveSync component service tile 102 of the Microsoft Exchange™ service (see, e.g., dashboard 100 of FIG. 1A) or the tile 206 of the ActiveSync system-level dashboard (see, e.g., dashboard 200 of FIG. 2).

The methods 700, 800 and/or 900 may be performed continuously and/or periodically to determine updated performance information for a service. For example, the methods 700, 800 and/or 900 may be performed in response to receiving new source data that is relevant to the respective determinations, and/or the methods 700, 800 and/or 900 may be performed periodically (e.g., every 1 minute, 10 minutes, 1 hour, and/or the like). Thus, the performance data may be continually or periodically updated to reflect the most recently received machine data 512.

Figure 10A:
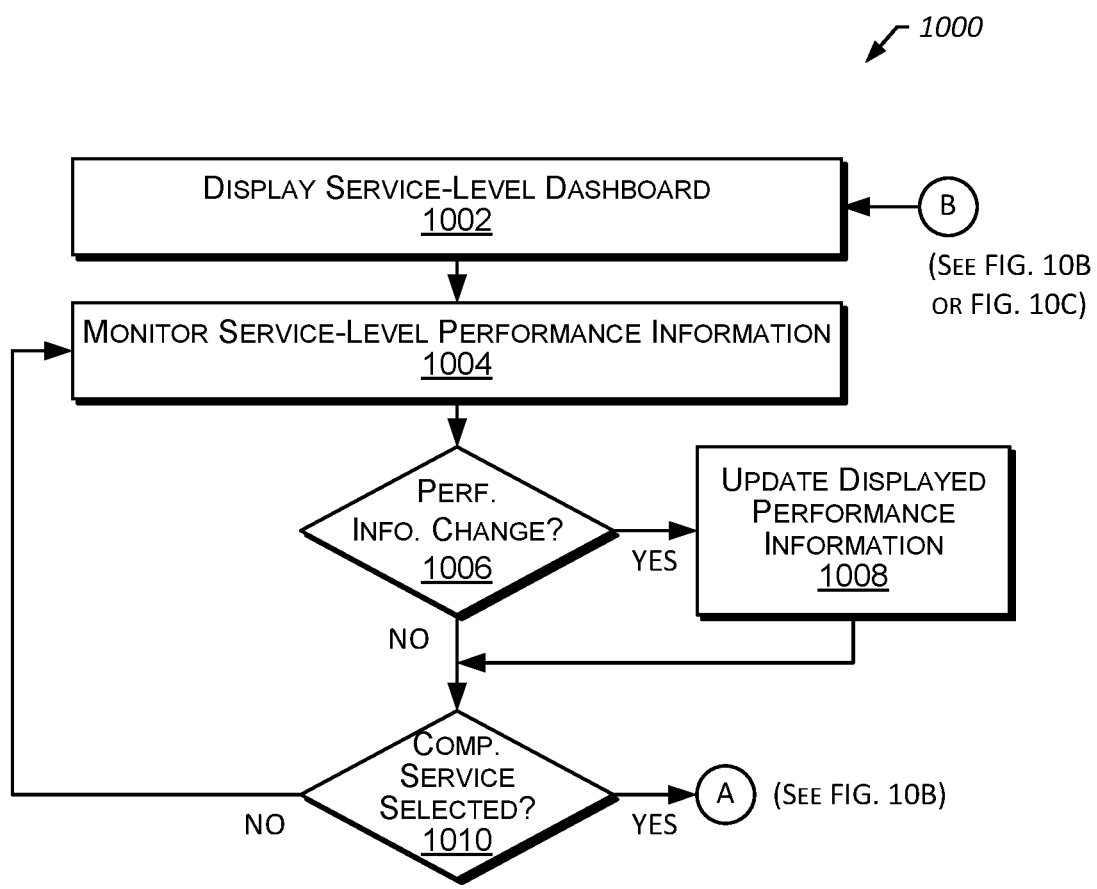
FIGS. 10A-10C are flowcharts that illustrate an example method for displaying interactive dashboards in accordance with the disclosed embodiments.
Figure 10B:
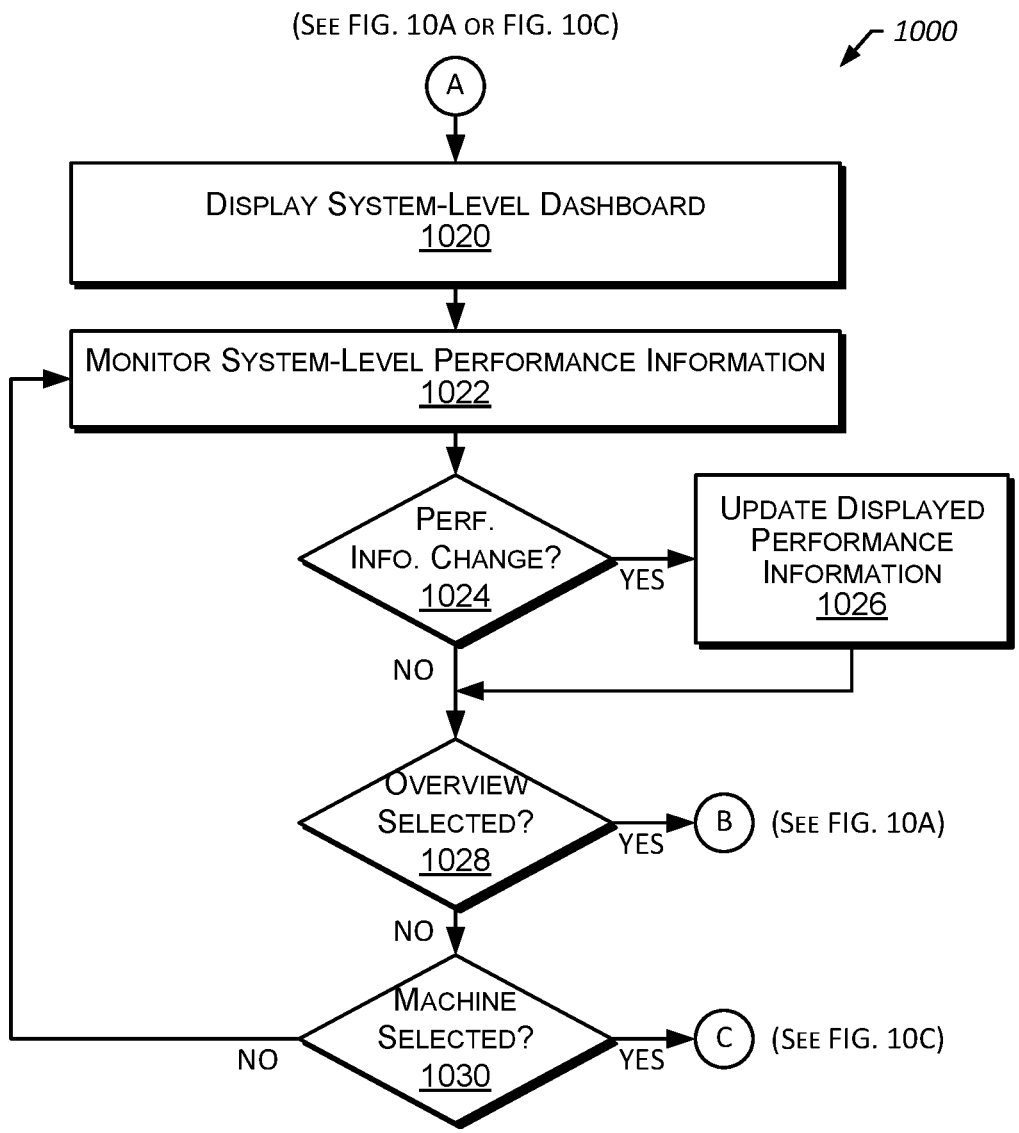
Figure 10C:
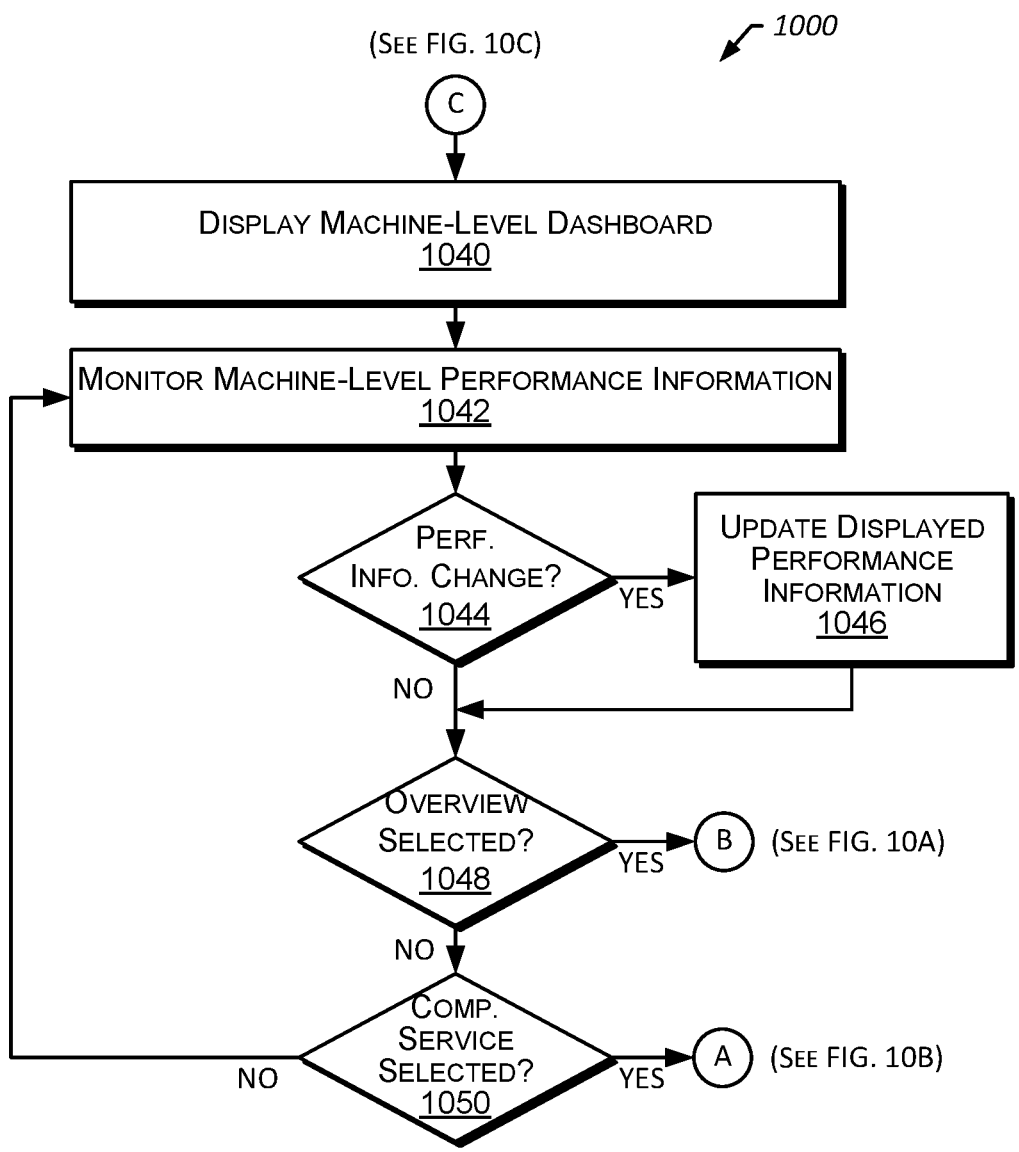

FIGS. 10A-10C are flowcharts that illustrate an example method 1000 of displaying interactive service analyzer dashboards in accordance with the disclosed embodiments. Some or all of the aspects of method 1000 may be performed by the graphical user (GUI) interface module 558. In some embodiments, displaying a service-level dashboard (block 1002) includes the graphical user (GUI) interface module 558 providing for the display of the service-level dashboard 100 (e.g., displaying dashboard 100 of FIG. 1A). In some embodiments, monitoring service-level performance information (block 1004) includes the graphical user (GUI) interface module 558 monitoring the machine data and/or the service data generated (e.g., monitoring the data generated via method 700 and/or method 800) to determine whether any performance information represented in the service-level dashboard (e.g., a composite component service score, a status for any of the component services, and/or the like) has changed. In response to determining that any performance information represented in the service-level dashboard has changed (block 1006), the graphical user interface (GUI) module 558 may update the displayed performance information (block 1008) (e.g., provide for dynamically updating the displayed performance information displayed in the service-level dashboard 100).

The method may also include the graphical user interface (GUI) module 558 determining whether a particular component service has been selected (e.g., a user has selected a component service tile 102). If no component service has been selected, the method 1000 may include the graphical user interface (GUI) module 558 continuing to monitor the service data (block 1004) and update the displayed service information as appropriate (block 1008).

If a component service is selected, the method 1000 may include the graphical user interface (GUI) module 558 proceeding to provide for display of a system-level dashboard (block 1020) (see FIG. 10B). The system-level dashboard may correspond to the selected component service. For example, provide for display of a system-level dashboard may include providing for display of the dashboard 200 of FIG. 2 if the ActiveSync tile 102 is selected. In some embodiments, monitoring service data (block 1022) includes the graphical user interface (GUI) module 558 monitoring the machine data and/or the service data generated (e.g., monitoring the data generated via method 700 and/or method 800) to determine whether any performance information represented in the system-level dashboard (e.g., a composite component service score, a status for any of the component services, and/or the like) has changed. In response to determining that performance information represented in the system-level dashboard has changed (block 1024), the graphical user interface (GUI) module 558 may update the displayed performance information (block 1026) (e.g., provide for dynamically updating the displayed performance information displayed in the system-level dashboard 200).

The method may also include the graphical user interface (GUI) module 558 determining whether the user has made a selection to return to the service level dashboard (block 1028 (e.g., a user has selected the Exchange Monitoring link 201 at the top of the system-level dashboard 200), or a particular machine has been selected (block 1030) (e.g., a user has selected a machine in the listing of machines 208 of dashboard 200). If no selection is made the method 1000 may include the graphical user interface (GUI) module 558 continuing to monitor the service data (block 1022) and update the displayed performance information as appropriate (block 1026). If a selection to return to the service-level dashboard has been made, the method 1000 may include returning to display of the service-level dashboard (e.g., return to display of the service-level dashboard 100 in response to selection of the Exchange Monitoring link 201 at the top of the system-level dashboard 200).

If a machine is selected (block 1030) the method 1000 may include the graphical user interface (GUI) module 558 proceeding to provide for display of a machine-level dashboard (block 1040) (see FIG. 10C). The machine-level dashboard may correspond to the selected machine. For example, providing for display of a machine-level dashboard may include providing for display of the dashboard 300 of FIG. 3 if the EXSRV.122 server is selected. In some embodiments, monitoring service data (block 1042) includes the graphical user interface (GUI) module 558 monitoring the machine data and/or the service data generated (e.g., monitoring the data generated via method 700 and/or method 800) to determine whether any performance information represented in the machine-level dashboard (e.g., a metric value, a matric score, and/or the like) has changed. In response to determining that performance information represented in the machine-level dashboard has changed (block 1044), the graphical user interface (GUI) module 558 may update the displayed performance information (block 1046) (e.g., provide for dynamically updating the displayed performance information displayed in the machine-level dashboard 200).

The method may also include the graphical user interface (GUI) module 558 determining whether the user has made a selection to return to the service level dashboard (block 1048 (e.g., a user has selected the Exchange Monitoring link 302 at the top of the machine-level dashboard 300), or the user has made a selection to return to the system-level dashboard (block 1050 (e.g., a user has selected the ActiveSync link 301 at the top of the machine-level dashboard 300). If no selection is made, the method 1000 may include the graphical user interface (GUI) module 558 continuing to monitor the service data (block 1042) and update the displayed performance information as appropriate (block 1046). If a selection has been made, the method 1000 may include returning to display of the dashboard corresponding to the selection (e.g., return to display of the service-level dashboard 100 in response to selection of the Exchange Monitoring link 302, or return to display of the system-level dashboard 200 in response to selection of the ActiveSync link 301).

As described above, in some instances, the performance information is based on data, or source data, received from one or more external data sources, such as servers, computers, routers, databases, operating systems, applications and/or the like. The source data may include raw data, which can include unstructured data, machine data, performance measurements or other time-series data, such as data obtained from weblogs, syslogs, or sensor readings. In some embodiments, the performance information can include or be based on data provided by an operating system, such as by an operating system's performance software executing on the machines associated with the service, and/or provided by a hypervisor (or virtual machine monitor (VMM)) associated with a virtual machine. Further, in some embodiments, the performance information can include or be based on data that is retrieved from a data store or similar source. For example, in the context of a system that can store and access performance data, such as SPLUNK® ENTERPRISE system (described in more detail herein with regard to at least FIGS. 11-17D), the source data may include performance data retrieved from a data store (e.g., of a performance data system) via one or more searches of the data store. In some embodiments, such a performance data system, can include performance data stored in a data store and can conduct searches or queries on the stored data (e.g., continually, in real-time) to identify and provide a stream of relevant performance data that can be used to generate, or otherwise determine machine metrics and/or other performance information described herein. The following describes an example performance data system that can be employed to provide performance data for use in generating, or otherwise determining, machine metrics and/or other performance information that can be used as the basis of the above described visualization of the performance information, e.g., including the service, system and machine level dashboards 100, 200 and 300, respectively.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, California, to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a pre-defined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 11:
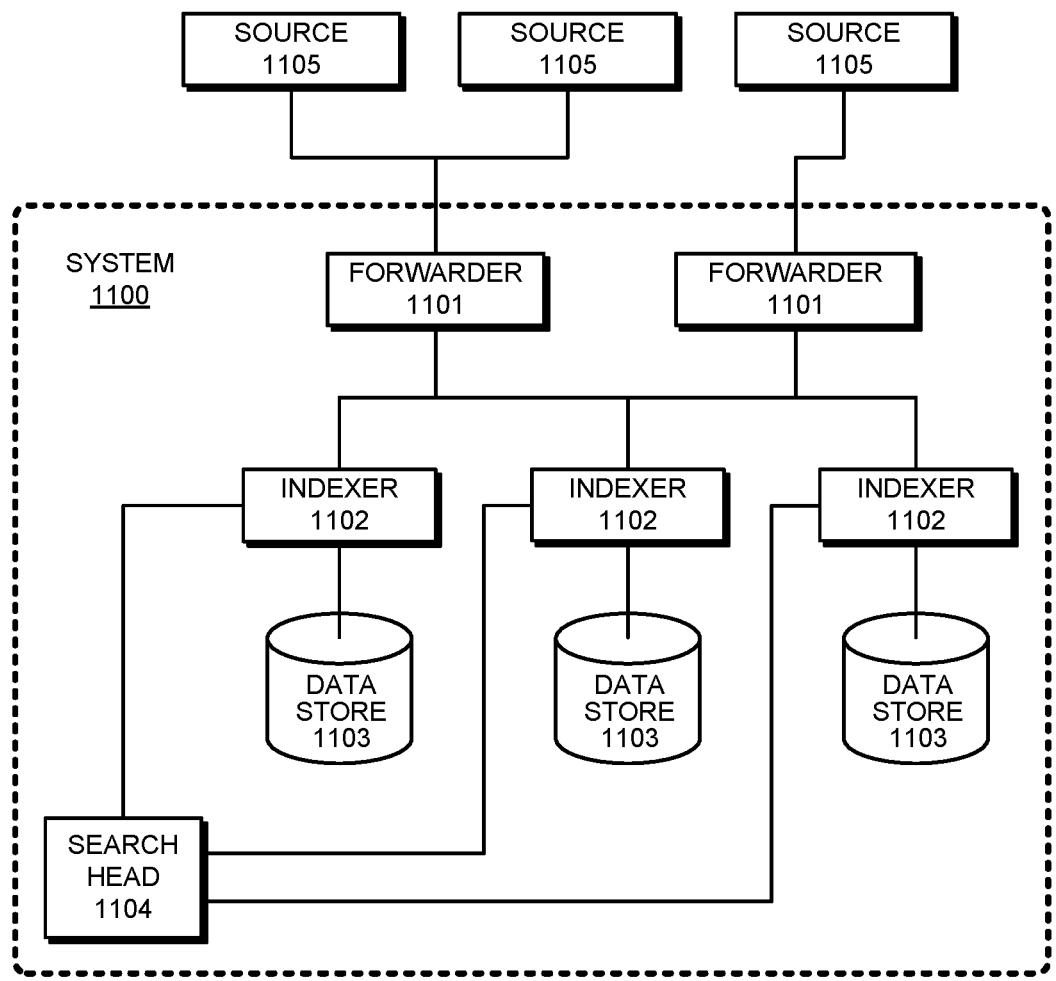
FIG. 11 presents a block diagram of an example event-processing system in accordance with the disclosed embodiments.

FIG. 11 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 11-15 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 12:
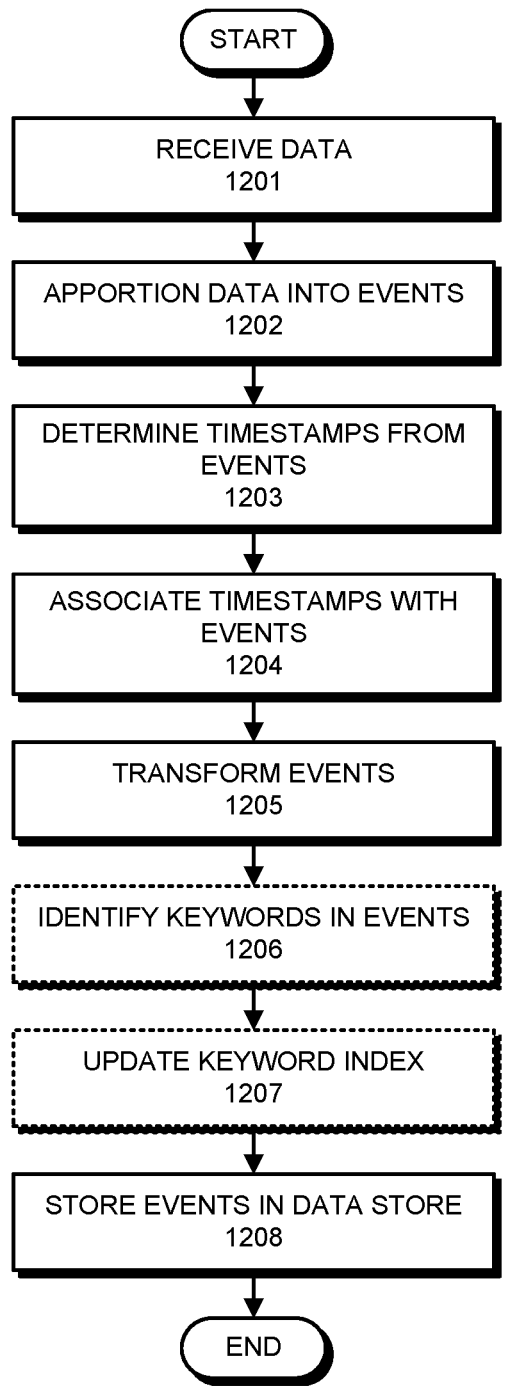
FIG. 12 presents a flowchart illustrating an example of how indexers process, index, and store data received from forwarders in accordance with the disclosed embodiments.

FIG. 12 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 1204, for example by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event.

Note that a user can specify portions to be removed using a regular expression or any other possible technique.

Next, a keyword index can optionally be generated to facilitate fast keyword searching for events. To build a keyword index, the indexer first identifies a set of keywords in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, which is hereby incorporated herein by reference in its entirety for all purposes, and in U.S. patent application Ser. No. 14/266,817 also filed on 30 Apr. 2014, which is hereby incorporated herein by reference in its entirety for all purposes.

1.4 Query Processing

Figure 13:
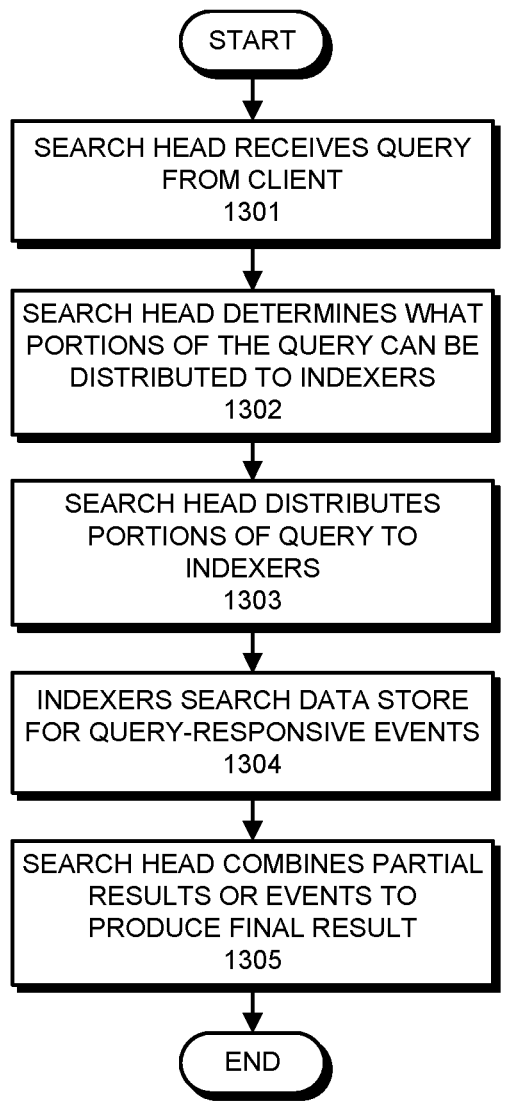
FIG. 13 presents a flowchart illustrating an example of how a search head and indexers perform a search query in accordance with the disclosed embodiments.

FIG. 13 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding scheme to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 14:
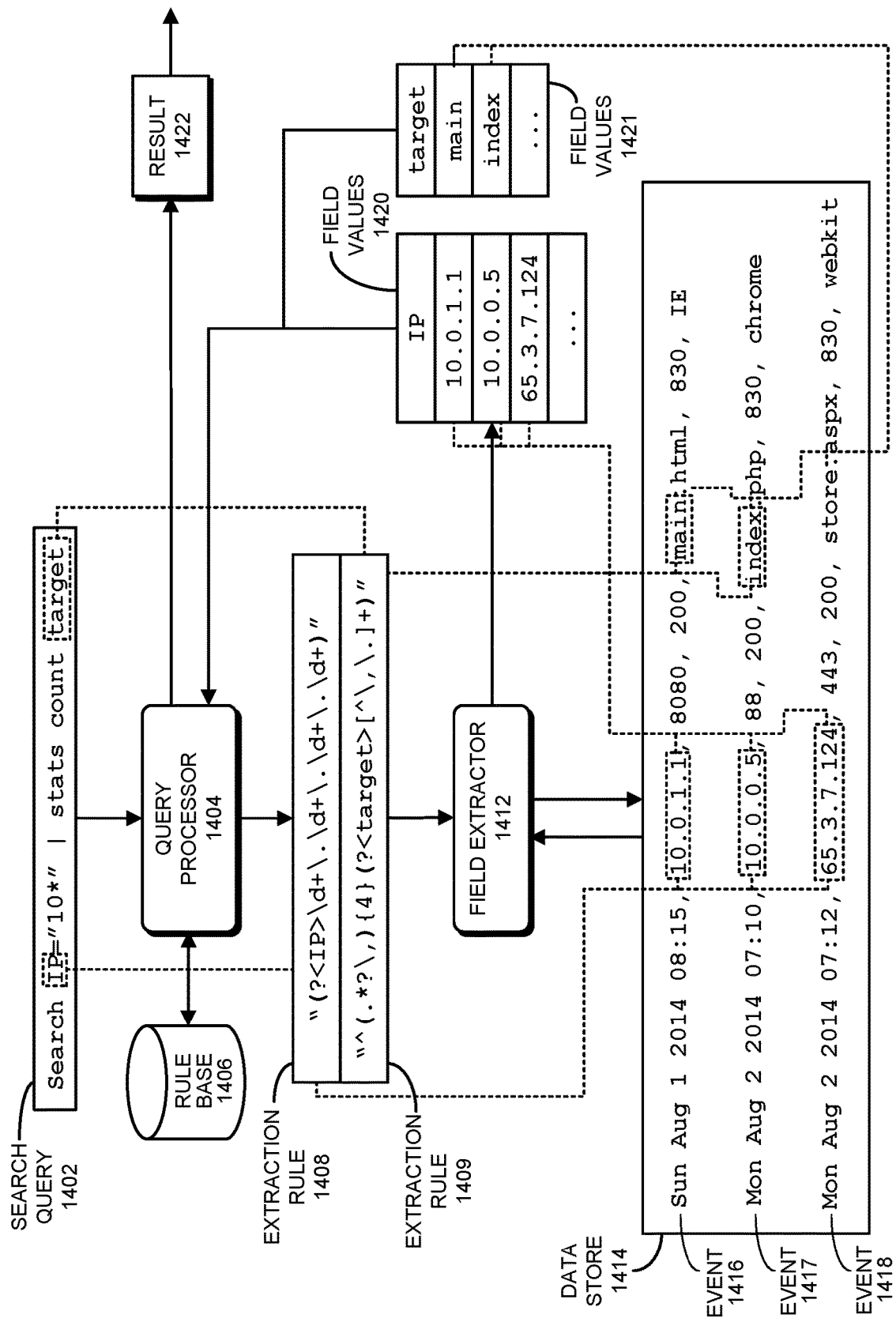
FIG. 14 presents a block diagram of an example system for processing search requests that uses extraction rules for field values in accordance with the disclosed embodiments.

FIG. 14 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 14 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language ("SQL") or any suitable query language.

Upon receiving search query 1402, query processor 1404 sees that search query 1402 includes two fields "IP" and "target." Query processor 1404 also determines that the values for the "IP" and "target" fields have not already been extracted from events in data store 414, and consequently determines that query processor 1404 needs to use extraction rules to extract values for the fields. Hence, query processor 1404 performs a lookup for the extraction rules in a rule base 1406, wherein rule base 1406 maps field names to corresponding extraction rules and obtains extraction rules 1408-409, wherein extraction rule 1408 specifies how to extract a value for the "IP" field from an event, and extraction rule 1409 specifies how to extract a value for the "target" field from an event. As is illustrated in FIG. 14, extraction rules 1408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 1404 sends extraction rules 1408-409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 14. Moreover, the query processor 1404 can instruct field extractor 1412 to apply the extraction rules to all the events in a data store 414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 16A:
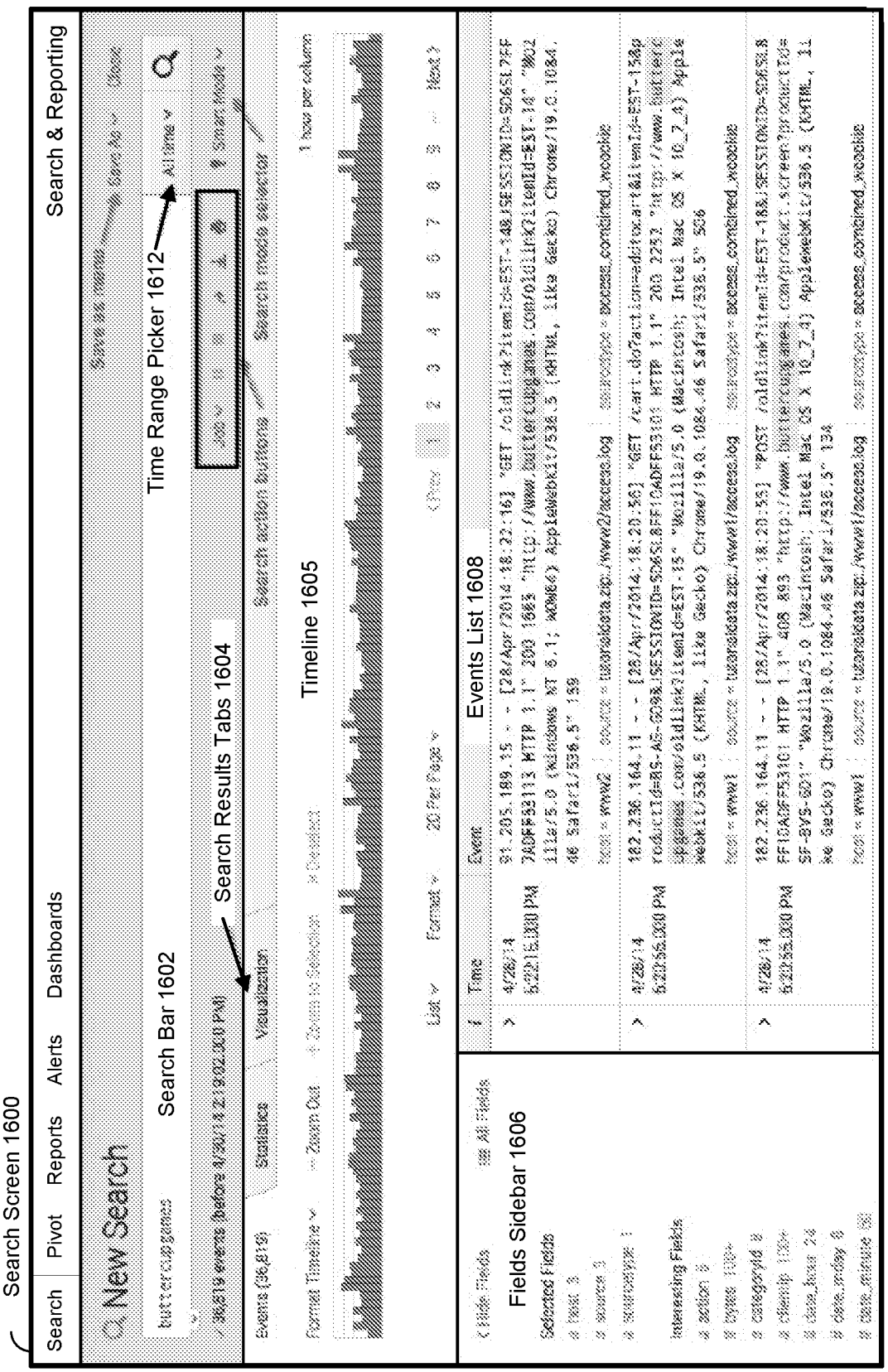
FIG. 16A illustrates an example search screen in accordance with the disclosed embodiments.
Figure 16B:
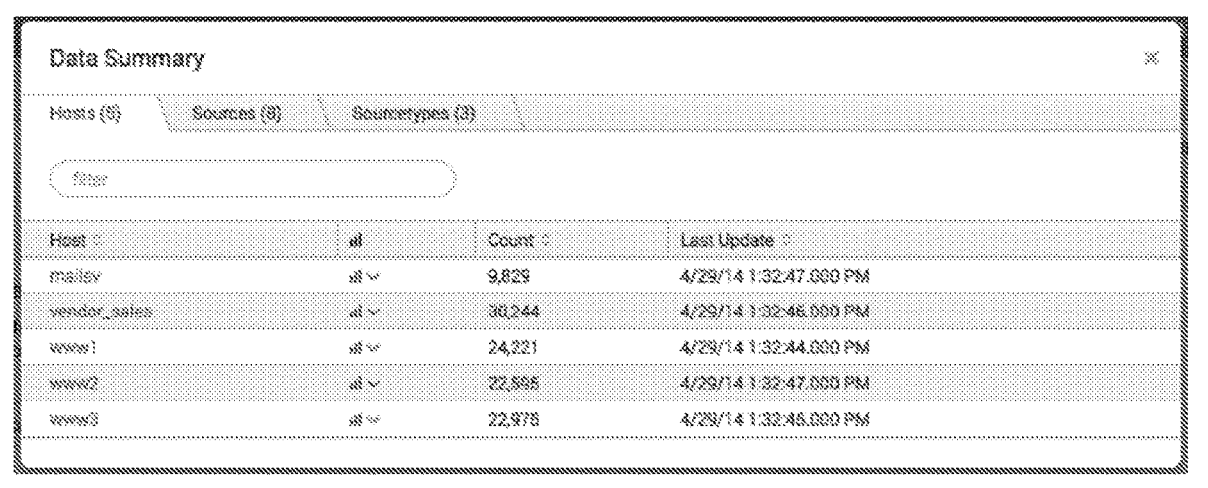

FIG. 16A illustrates an exemplary search screen 1600 in accordance with the disclosed embodiments. Search screen 1600 includes a search bar 1602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 1600 also initially displays a "data summary" dialog as is illustrated in FIG. 16B that enables the user to select different sources for the event data, for example by selecting specific hosts and log files.

After the search is executed, the search screen 1600 can display the results through search results tabs 1604, wherein search results tabs 1604 includes: an "events tab" that displays various information about events returned by the search; a "statistics tab" that displays statistics about the search results; and a "visualization tab" that displays various visualizations of the search results. The events tab illustrated in FIG. 16A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 15 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 13, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flow charts in FIGS. 12 and 13, event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated herein by reference in its entirety for all purposes.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, which is hereby incorporated herein by reference in its entirety for all purposes, and U.S. Pat. No. 8,412,696, issued on Apr. 2, 2011, which is hereby incorporated herein by reference in its entirety for all purposes.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262, which are both hereby incorporated herein by reference in its entirety for all purposes). Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
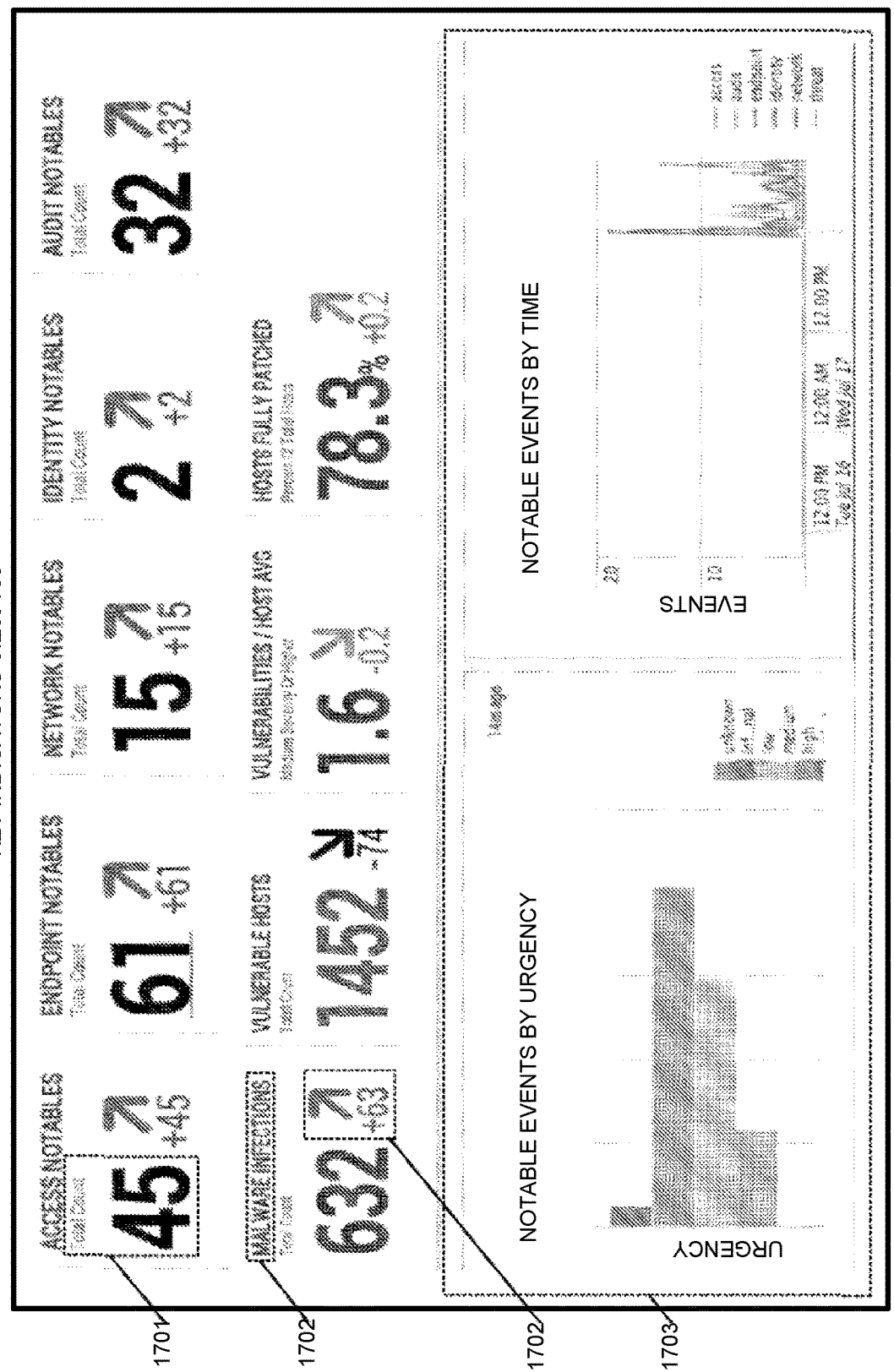
FIG. 17A illustrates an example key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 17A illustrates an exemplary key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338 filed Jul. 31, 2013, which is hereby incorporated herein by reference in its entirety for all purposes.

Figure 17B:
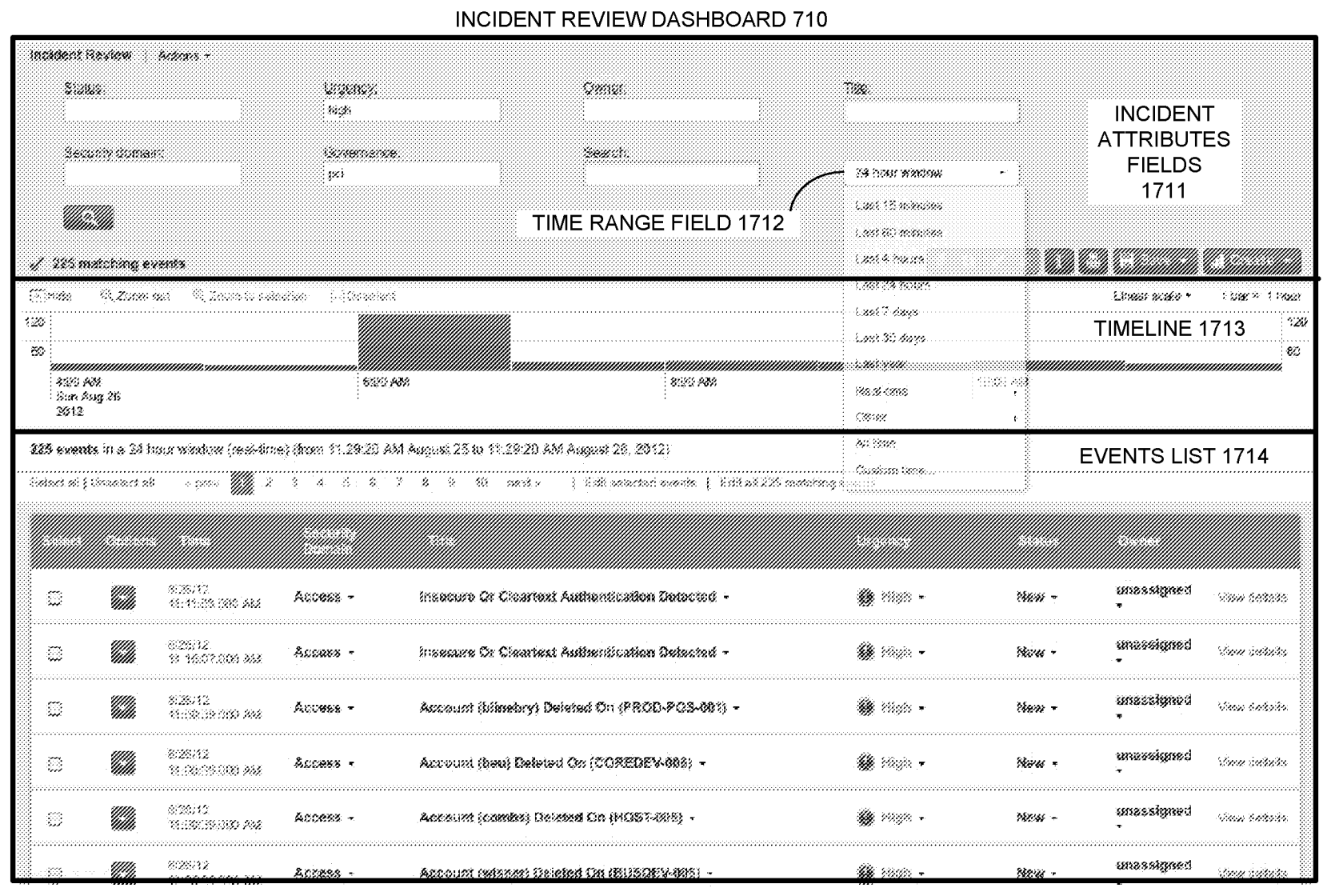

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review is described further in dashboard "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference in its entirety for all purposes. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 17C:
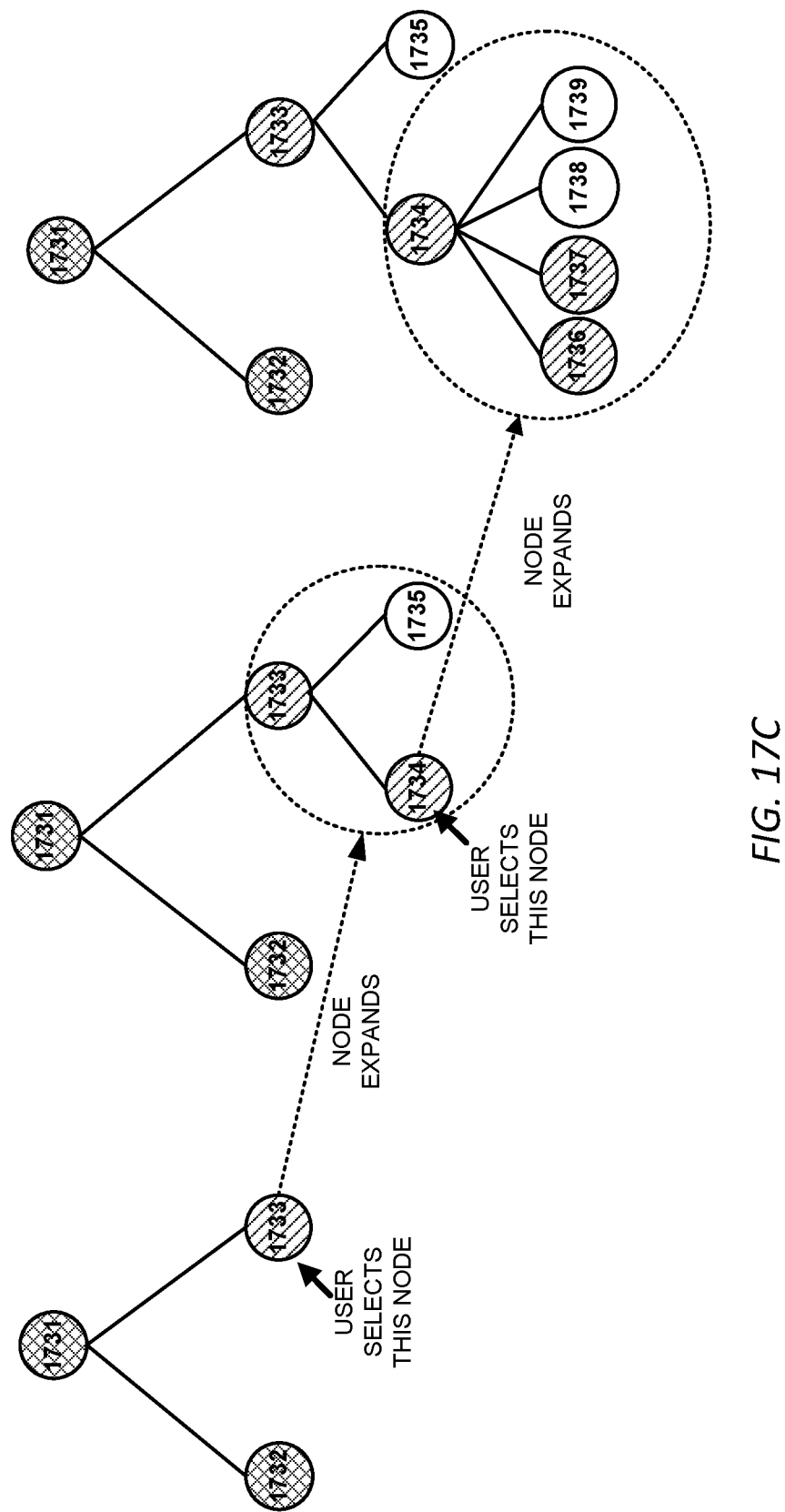
FIG. 17C illustrates an example proactive monitoring tree in accordance with the disclosed embodiments.
Figure 17D:
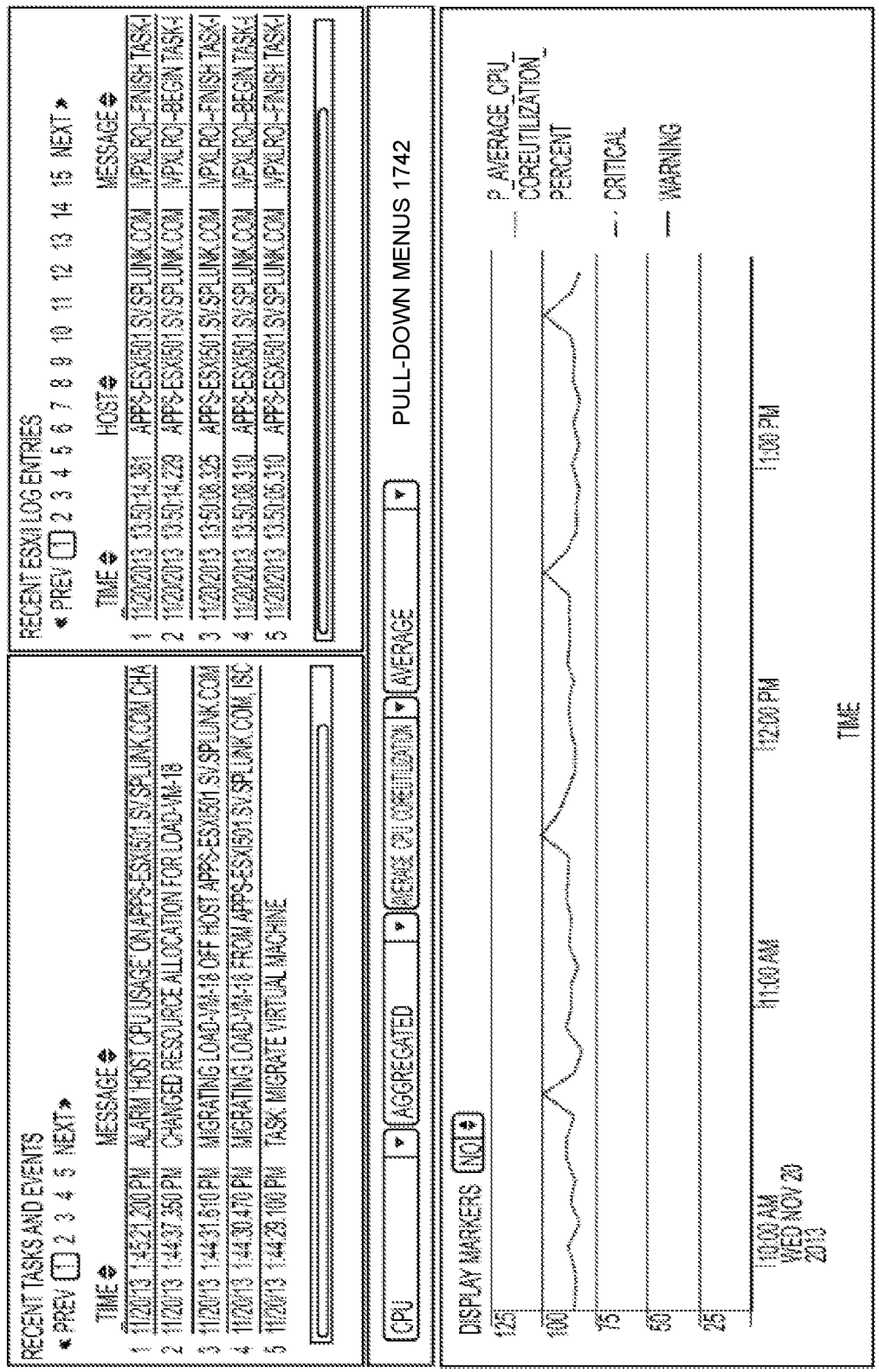
FIG. 17D illustrates an example screen displaying both log data and performance data in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference in its entirety for all purposes.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference in its entirety for all purposes.

Figure 18:
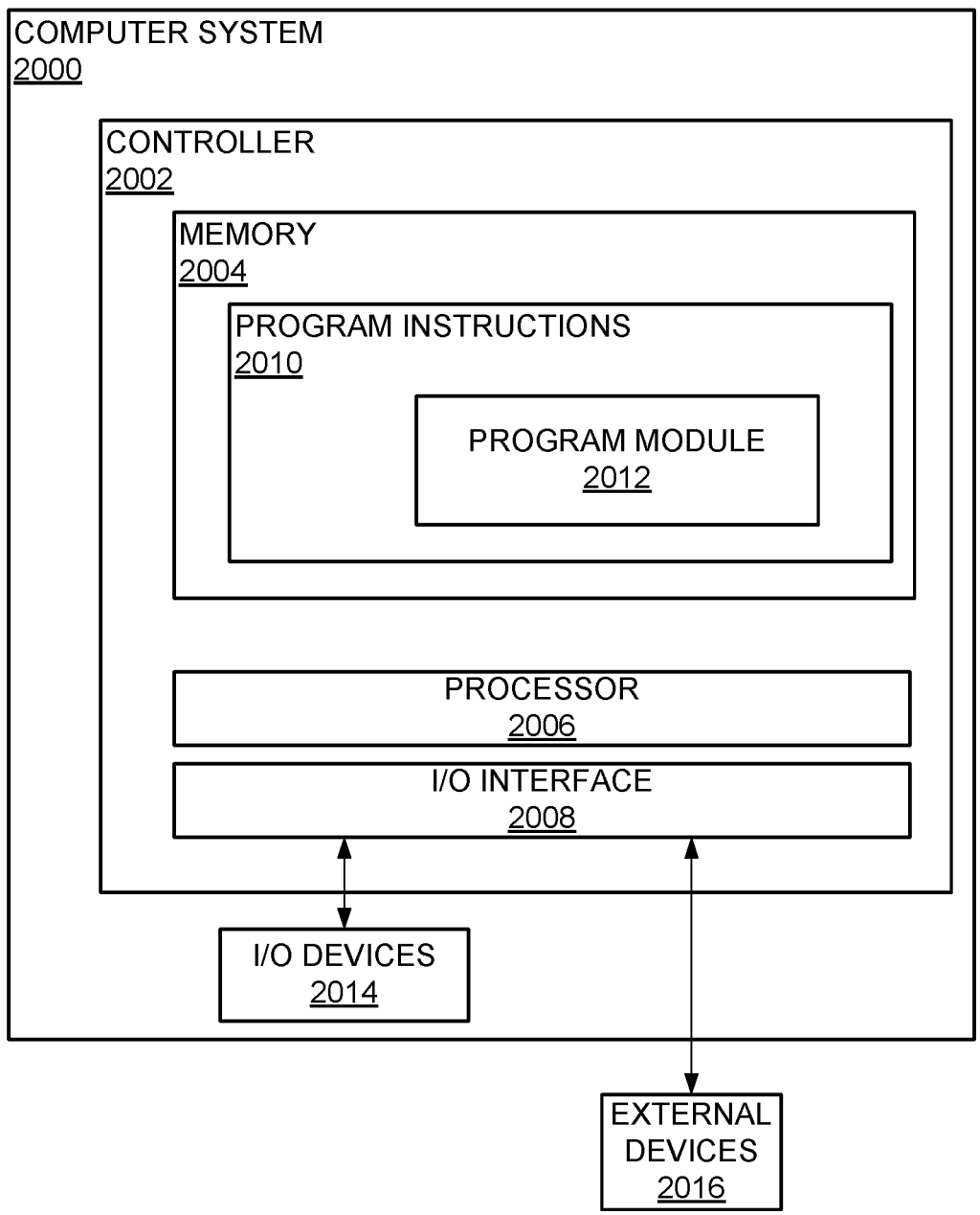
FIG. 18 is a diagram that illustrates an example computer system in accordance with the disclosed embodiments.

FIG. 18 is a diagram that illustrates an example computer system 2000 in accordance with the disclosed embodiments. In some embodiments, the computer system 2000 includes a controller 2002 for controlling the operational aspects of the computer system 2000. In some embodiments, the controller 2002 includes a memory 2004, a processor 2006, and an input/output (I/O) interface 2008. The memory 2004 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), and/or the like. The memory 2004 may include a non-transitory computer-readable storage medium having program instructions 2010 stored thereon that are executable by a computer processor (e.g., the processor 2006) to cause the functional operations (e.g., methods, routines, or processes) described herein. The program instructions 2010 may include program modules 2012 (e.g., including program instructions) that are executable by the processor 2006 to provide some or all of the functionality described herein, including that described with regard to the server 502, the data sources 504, the client devices 506, and/or the methods 600, 700, 800, 900 and/or 1000. The program instructions 2010 may include, for example, program modules 2012 such as one or more of the modules of service analyzer 522 (e.g., one or more of the definition module 550, the machine monitoring module 552, the component service monitoring module 554, the threshold event monitoring module 556, and the graphical user (GUI) interface module 558).

The processor 2006 may be any suitable processor capable of executing/performing program instructions. The processor 2006 may include a central processing unit (CPU) that carries out program instructions (e.g., program instructions of the program module(s) 2012) to perform arithmetical, logical, and input/output operations described herein, including those described with regard to server 502, the data sources 504, the client devices 506 and/or other entities described. The processor 2006 may include one or more processors.

The I/O interface 2008 may provide an interface for communication with one or more I/O devices 2014, such as a mouse/keyboard/touchscreen, a graphical user interface (GUI) (e.g., a display), and/or the like. A display may include a suitable electronic display that can display dashboards 100, 200 and 300 and/or the like. Devices may be connected to the I/O interface 2008 via a wired or wireless connection. The I/O interface 2008 may provide an interface for communication with one or more external devices 2016, such as various components and entities of the environment 500, including the network 508.

Further modifications and embodiments of various aspects of the disclosure will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method comprising:
    visually rendering a service-level dashboard reflecting performance of a service, wherein the service comprises a plurality of component services within an information technology environment, and wherein the service-level dashboard presents a visual indication of health of each of the plurality of component services, and a list of events each corresponding to a change in performance of one of the plurality of the component services; and
    responsive to receiving, via a graphical user interface (GUI), a selection of a component service of the plurality of component services within the information technology environment:
    visually rendering a system-level dashboard reflecting performance of the selected component service,
    wherein the selected component service is performed by one or more machines, and the system-level dashboard presents the selected component service, the one or more machines that perform the selected component service, and one or more events corresponding to a selected machine of the one or more machines that perform the selected component service, wherein at least one event is generated for display based on a determination that the at least one event corresponds to a change of a metric score associated with the selected machine exceeding a threshold value for a metric resulting in a transition from a first performance state of the metric to a second performance state of the metric, wherein the at least one event comprises a discrete portion of text machine data describing a corresponding event and associated with a timestamp from the selected machine of the one or more machines.

2. The computer-implemented method of claim 1, wherein the visual indication of health of each of the plurality of the component services represents a component service score of a respective component service.

3. The computer-implemented method of claim 1, further comprising:
    responsive to receiving, via the GUI, selection of a machine of the one or more machines, visually rendering a machine-level dashboard presenting additional information pertaining to performance of the selected machine.

4. The computer-implemented method of claim 1, wherein the system-level dashboard further presents a machine score of each of the one or more machines, the machine score representing a health of a respective machine.

5. The computer-implemented method of claim 4, wherein the machine score is a composite machine score value that is based on a plurality of metric scores each corresponding to one of a plurality of monitored elements of a respective machine.

6. The computer-implemented method of claim 1, wherein:
    the metric score is derived from source data produced by the respective machine, the source data reflected in computer storage as timestamped events and is based at least in part on at least one of the following: system logs, network packet data, sensor data, and performance monitoring application output data; and
    the deriving includes identifying at least one field value from the source data of timestamped events by applying an extraction rule.

7. The computer-implemented method of claim 5, wherein the composite machine score value for the respective machine is compared to one or more predefined thresholds to determine a health status for the respective machine from among a set of predefined health statuses, each threshold associated with at least one of the predefined health statuses to delimit a range of corresponding values.

8. The computer-implemented method of claim 1, wherein the health of each of the plurality of component services corresponds to a health of a particular machine of one or more machines performing a respective component service.

9. The computer-implemented method of claim 1, wherein the one or more machines comprises at least one virtual machine.

10. A system comprising:
a memory comprising program instructions; and
one or more processors to execute the program instructions to perform operations comprising;
visually rendering a service-level dashboard reflecting performance of a service, wherein the service comprises a plurality of component services within an information technology environment, and wherein the service-level dashboard presents a visual indication of health of each of the plurality of component services, and a list of events each corresponding to a change in performance of one of the plurality of the component services; and
responsive to receiving, via a graphical user interface (GUI), a selection of a component service of the plurality of component services within the information technology environment:
visually rendering a system-level dashboard reflecting performance of the selected component service,
wherein the selected component service is performed by one or more machines, and the system-level dashboard presents the selected component service, the one or more machines that perform the selected component service, and one or more events each corresponding to a selected machine of the one or more machines that perform the selected component service, wherein at least one event is generated for display based on a determination that the at least one event corresponds to a change of a metric score associated with the selected machine exceeding a threshold value for a metric resulting in a transition from a first performance state of the metric to a second performance state of the metric, wherein the at least one event comprises a discrete portion of text machine data describing a corresponding event and associated with a timestamp from the selected machine of the one or more machines.

11. The system of claim 10, wherein the visual indication of health of each of the plurality of the component services represents a component service score of a respective component service.

12. The system of claim 10, the operations further comprising:
responsive to receiving, via the GUI, selection of a machine of the one or more machines, visually rendering a machine-level dashboard presenting additional information pertaining to performance of the selected machine.

13. The system of claim 10, wherein the system-level dashboard further presents a machine score of each of the one or more machines, the machine score representing a health of a respective machine.

14. The system of claim 13, wherein the machine score is a composite machine score value that is based on a plurality of metric scores each corresponding to one of a plurality of monitored elements of a respective machine.

15. The system of claim 10, wherein:
the metric score is derived from source data produced by the respective machine, the source data reflected in computer storage as timestamped events and is based at least in part on at least one of the following: system logs, network packet data, sensor data, and performance monitoring application output data; and
the deriving includes identifying at least one field value from the source data of timestamped events by applying an extraction rule.

16. The system of claim 14, wherein the composite machine score value for the respective machine is compared to one or more predefined thresholds to determine a health status for the respective machine from among a set of predefined health statuses, each threshold associated with at least one of the predefined health statuses to delimit a range of corresponding values.

17. The system of claim 10, wherein the health of each of the plurality of component services corresponds to a health of a particular machine of one or more machines performing a respective component service.

18. A non-transitory computer readable medium comprising program instructions, which when executed by one or more processors cause the one or more processors to perform operations comprising:
visually rendering a service-level dashboard reflecting performance of a service, wherein the service comprises a plurality of component services within an information technology environment, and wherein the service-level dashboard presents a visual indication of health of each of the plurality of component services, and a list of events each corresponding to a change in performance of one of the plurality of the component services; and
responsive to receiving, via a graphical user interface (GUI), a selection of a component service of the plurality of component services within the information technology environment:
visually rendering a system-level dashboard reflecting performance of the selected component service,
wherein the selected component service is performed by one or more machines, and the system-level dashboard presents the selected component service, the one or more machines that perform the selected component service, and one or more events corresponding to a selected machine of the one or more machines that perform the selected component service, wherein at least one event is generated for display based on a determination that the at least one event corresponds to a change of a metric score associated with the selected machine exceeding a threshold value for a metric resulting in a transition from a first performance state of the metric to a second performance state of the metric, wherein the at least one event comprises a discrete portion of text machine data describing a corresponding event and associated with a timestamp from the selected machine of the one or more machines.

19. The non-transitory computer readable medium of claim 18, wherein the system-level dashboard further presents a machine score of each of the one or more machines, the machine score representing a health of a respective machine.

20. The non-transitory computer readable medium of claim 19, wherein:

the machine score is a composite machine score value that is based on a plurality of metric scores each corresponding to one of a plurality of monitored elements of a respective machine;

the metric score is derived from source data produced by the respective machine, the source data reflected in computer storage as timestamped events and is based at least in part on at least one of the following: system logs, network packet data, sensor data, and performance monitoring application output data; and the deriving includes identifying at least one field value from the source data of timestamped events by applying an extraction rule of a late-binding schema.

\* \* \* \* \*